United States Patent
Nguyen et al.

(10) Patent No.: US 11,510,207 B2
(45) Date of Patent: Nov. 22, 2022

(54) DISTANCE BASED RESOURCE EXCLUSION

(71) Applicant: QUALCOMM Incorporated, San Diego, CA (US)

(72) Inventors: Tien Viet Nguyen, Bridgewater, NJ (US); Sudhir Kumar Baghel, Hillsborough, NJ (US); Kapil Gulati, Hillsborough, NJ (US); Arjun Bharadwaj, Cupertino, CA (US); Shuanshuan Wu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/739,005

(22) Filed: Jan. 9, 2020

(65) Prior Publication Data
US 2020/0229174 A1 Jul. 16, 2020

Related U.S. Application Data

(60) Provisional application No. 62/791,029, filed on Jan. 11, 2019.

(51) Int. Cl.
*H04W 72/04* (2009.01)
*H04W 72/02* (2009.01)
(Continued)

(52) U.S. Cl.
CPC ......... *H04W 72/048* (2013.01); *H04W 64/00* (2013.01); *H04W 72/02* (2013.01);
(Continued)

(58) Field of Classification Search
CPC ... H04W 4/44; H04W 72/1284; H04W 72/02; H04W 72/0406; H04B 17/251
(Continued)

(56) References Cited

U.S. PATENT DOCUMENTS 8,265,640 B2 * 9/2012 Meylan ............ H04W 72/1284
455/450
2008/0146231 A1 * 6/2008 Huang .................. H04B 17/27
455/436
(Continued)

FOREIGN PATENT DOCUMENTS

WO WO2014165655 A1 * 10/2014
WO WO2020146366 A1 * 7/2020
(Continued)

OTHER PUBLICATIONS

Survey and Taxonomy of Transmissions Power Control Mechanisms for Wireless Body Area Networks by Duarte Fernandes; André G. Ferreira; Reza Abrishambaf; José Mendes; Jorge Cabral Published in: IEEE Communications Surveys & Tutorials (vol. 20, Issue: 2, Secondquarter 2018) Dec. 2017 (Year: 2017).*
(Continued)

*Primary Examiner* — William D Cumming
(74) *Attorney, Agent, or Firm* — Danai Nelisile Mhembere; Holland & Hart LLP

(57) ABSTRACT

A device may determine a set of parameters related to a transmission of a packet. For example, a device may determine a transmission range indication for the packet, a Quality-of-Service (QoS) of the packet, or a combination thereof. The device may then determine a resource exclusion parameter related to the transmission of the packet based in part on the set of parameters. Following the determination, the device may transmit, to one or more other devices in a wireless communications system, control signaling including the resource exclusion parameter.

28 Claims, 14 Drawing Sheets

(51) Int. Cl.
H04W 64/00 (2009.01)
H04W 72/08 (2009.01)
H04W 92/18 (2009.01)

(52) U.S. Cl.
CPC ... *H04W 72/0406* (2013.01); *H04W 72/0486* (2013.01); *H04W 72/087* (2013.01); *H04W 72/044* (2013.01); *H04W 92/18* (2013.01)

(58) Field of Classification Search
USPC .................................................. 455/436, 450
See application file for complete search history.

(56) References Cited

U.S. PATENT DOCUMENTS

| 2016/0277315 | A1* | 9/2016 | Miller | H04L 67/18 |
| 2019/0387377 | A1* | 12/2019 | Zhang | H04W 4/44 |
| 2020/0229174 | A1* | 7/2020 | Nguyen | H04W 72/0406 |

FOREIGN PATENT DOCUMENTS

| WO | WO-2021034670 | A1* | 2/2021 | ........ H04W 74/0808 |
| WO | WO-2021066741 | A1* | 4/2021 | ............ H04W 72/02 |
| WO | WO2022125886 | A1* | 6/2022 | |

OTHER PUBLICATIONS

M. H. C. Garcia et al., "A Tutorial on 5G NR V2X Communications," in IEEE Communications Surveys & Tutorials, vol. 23, No. 3, pp. 1972-2026, thirdquarter Feb. 2021, doi: 10.1109/COMST.2021.3057017. (Year: 2021).*
M. A. Mehaseb, Y. Gadallah, A. Elhamy and H. Elhennawy, "Classification of LTE Uplink Scheduling Techniques: An M2M Perspective," in IEEE Communications Surveys & Tutorials, vol. 18, No. 2, pp. 1310-1335, Secondquarter 2016, doi: 10.1109/COMST.November 2015.2504182. (Year: 2015).*
M. H. C. Garcia et al., "A Tutorial on 5G NR V2X Communications," in IEEE Communications Surveys & Tutorials, vol. 23, No. 3, pp. 1972-2026, thirdquarter 2021, doi: 10.1109/COMST.2021.3057017. (Year: 2021).*
CATT: "Discussion on Carrier Aggregation for Mode 4 in V2X Phase 2", 3GPP Draft, R1-1717789, 3rd Generation Partnership Project (3GPP), Mobile Competence Centre, 650, Route Des Lucioles, F-06921 Sophia-Antipolis Cedex, France, vol. RAN WG2, No. Prague, Czechia, Oct. 9, 2017-Oct. 13, 2017, Oct. 8, 2017 (Oct. 8, 2017), XP051340974, 8 pages, Retrieved from the Internet: URL: http://www.3gpp.org/ftp/Meetings_3GPP_SYNC/RAN1/Docs/. [retrieved on Oct. 8, 2017] Proposal 2, p. 6.
FUJITSU: "Resource Allocation for NR V2X Sidelink Communication", 3GPP Draft, R1-1812410, Resource Allocation for NR V2X Sidelink Communication Final, 3rd Generation Partnership Project (3GPP), Mobile Competence Centre, 650, Route Des Lucioles, F-06921 Sophia-Antipolis, vol. RAN WG2, No. Spokane, United States, Nov. 12, 2018-Nov. 16, 2018, Nov. 2, 2018 (Nov. 2, 2018), XP051478610, 9 pages, Retrieved from the Internet: URL: http://www.3gpp.org/ftp/tsg%5Fran/WG1%5FRL1/TSGR1%5F95/Docs/R1 %2D1812410%2Ezip. [retrieved on Nov. 2, 2018] Proposal 7.
International Search Report and Written Opinion—PCT/US2020/013230—ISA/EPO—dated Mar. 31, 2020.
ZTE: "Remaining Issues on Resource Selection in Mode 4 CA", 3GPP Draft, R1-1806098, Remaining Issues on Resource Selection in Mode 4 CA, 3rd Generation Partnership Project (3GPP), Mobile Competence Centre, 650, Route Des Lucioles, F-06921 Sophia-Antipolis Cedex, France, vol. RAN WG2, No. Busan, Korea, May 21, 2018-May 25, 2018, May 20, 2018 (May 20, 2018), XP051441310, 3 pages, Retrieved from the Internet: URL: http://www.3gpp.org/ftp/Meetings%5F3GPP%5FSYNC/RAN1/Docs/. [retrieved on May 20, 2018] 2.2. Resource exclusion on the reported candidate resource set.

* cited by examiner

DISTANCE BASED RESOURCE EXCLUSION

CROSS REFERENCE

The present Application for Patent claims the benefit of U.S. Provisional Patent Application No. 62/791,029 by NGUYEN et al., entitled "DISTANCE BASED RESOURCE EXCLUSION," filed Jan. 11, 2019, assigned to the assignee hereof, and expressly incorporated herein.

INTRODUCTION

The following relates to wireless communications, and more specifically to managing resources for communications.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

Some wireless communications systems may support direct communications between wireless communications devices (e.g., direct communications between multiple UEs). Examples of direct communications may include, but are not limited to, device-to-device (D2D) communications, vehicle-based communications, which may also be referred to as vehicle-to-everything (V2X) networks, vehicle-to-vehicle (V2V) networks, cellular V2X (C-V2X) networks, and the like. Some wireless communications systems that support direct communications, as defined above, may be susceptible to interference when multiple wireless communications devices in close proximity attempt to transmit packets on matching resources. As a result, these wireless communications devices may experience significant latency when attempting to transmit packets.

SUMMARY

A method of wireless communications at a device in a wireless communications system is described. The method may include determining a set of parameters related to a transmission of a packet, determining a resource exclusion parameter related to the transmission of the packet based on the set of parameters, and transmitting, to one or more other devices in the wireless communications system, control signaling including the resource exclusion parameter.

An apparatus for wireless communications at a device in a wireless communications system is described. The apparatus may include a processor and memory coupled with the processor. The processor and memory may be configured to determine a set of parameters related to a transmission of a packet, determine a resource exclusion parameter related to the transmission of the packet based on the set of parameters, and transmit, to one or more other devices in the wireless communications system, control signaling including the resource exclusion parameter.

Another apparatus for wireless communications in a wireless communications system is described. The apparatus may include means for determining a set of parameters related to a transmission of a packet, determining a resource exclusion parameter related to the transmission of the packet based on the set of parameters, and transmitting, to one or more other devices in the wireless communications system, control signaling including the resource exclusion parameter.

A non-transitory computer-readable medium storing code for wireless communications at a device in a wireless communications system is described. The code may include instructions executable by a processor to determine a set of parameters related to a transmission of a packet, determine a resource exclusion parameter related to the transmission of the packet based on the set of parameters, and transmit, to one or more other devices in the wireless communications system, control signaling including the resource exclusion parameter.

In some examples of the method, apparatuses, and non-transitory computer-readable medium described herein, determining the set of parameters may include operations, features, means, or instructions for determining a transmission range indication for the packet or a Quality-of-Service (QoS) of the packet, or a combination thereof, and determining the resource exclusion parameter based on the transmission range indication for the packet or the QoS of the packet, or a combination thereof.

Some examples of the method, apparatuses, and non-transitory computer-readable medium described herein may further include operations, features, means, or instructions for mapping the transmission range indication for the packet or the QoS of the packet, or a combination thereof to the resource exclusion parameter in a candidate set of resource exclusion parameters, where determining the resource exclusion parameter related to the transmission of the packet may be based on the mapping.

Some examples of the method, apparatuses, and non-transitory computer-readable medium described herein may further include operations, features, means, or instructions for determining the resource exclusion parameter based on a mapping of one or more resource exclusion parameters of one or more transmissions associated with the one or more other devices in the wireless communications system.

Some examples of the method, apparatuses, and non-transitory computer-readable medium described herein may further include operations, features, means, or instructions for determining a congestion level related to traffic load in the wireless communications system based on a resource unavailability, a packet size, or a packet priority, a QoS of the packet, or a mapping of one or more resource reservations of one or more transmissions associated with the one or more other devices in the wireless communications system, or a combination thereof, the one or more resource reservations including one or more transmission time intervals, and mapping the congestion level to a congestion index value, where determining the resource exclusion parameter may be based on the congestion index value.

In some examples of the method, apparatuses, and non-transitory computer-readable medium described herein, transmitting the control signaling may include operations, features, means, or instructions for including, in the control signaling, information including a position of the device within the wireless communications system.

In some examples of the method, apparatuses, and non-transitory computer-readable medium described herein, the set of parameters includes a transmission range indication for the packet, a QoS of the packet, or a priority of the packet, or a combination thereof.

In some examples of the method, apparatuses, and non-transitory computer-readable medium described herein, the resource exclusion parameter may be a resource avoidance mechanism to the one or more other devices in the wireless communications system.

A method of wireless communications at a device in a wireless communications system is described. The method may include determining a resource exclusion parameter related to a transmission of a packet based on a set of parameters, determining resources to select for the transmission of the packet based on the resource exclusion parameter and one or more resource exclusion parameters associated with one or more other devices in the wireless communications system, and selecting the resources for the transmission of the packet based on the determining.

An apparatus for wireless communications at a device in a wireless communications system is described. The apparatus may include a processor and memory coupled with the processor. The processor and memory may be configured to cause the apparatus to determine a resource exclusion parameter related to a transmission of a packet based on a set of parameters, identify resources to select for the transmission of the packet based on the resource exclusion parameter and one or more resource exclusion parameters associated with one or more other devices in the wireless communications system, and select the resources for the transmission of the packet based on the determining.

Another apparatus for wireless communications in a wireless communications system is described. The apparatus may include means for determining a resource exclusion parameter related to a transmission of a packet based on a set of parameters, determining resources to select for the transmission of the packet based on the resource exclusion parameter and one or more resource exclusion parameters associated with one or more other devices in the wireless communications system, and selecting the resources for the transmission of the packet based on the determining.

A non-transitory computer-readable medium storing code for wireless communications at a device in a wireless communications system is described. The code may include instructions executable by a processor to determine a resource exclusion parameter related to a transmission of a packet based on a set of parameters, identify resources to select for the transmission of the packet based on the resource exclusion parameter and one or more resource exclusion parameters associated with one or more other devices in the wireless communications system, and select the resources for the transmission of the packet based on the determining.

Some examples of the method, apparatuses, and non-transitory computer-readable medium described herein may further include operations, features, means, or instructions for determining a distance between the device and the one or more other devices in the wireless communications system, where determining the resources to select for the transmission of the packet may be based on the distance between the device and the one or more other devices in the wireless communications system.

Some examples of the method, apparatuses, and non-transitory computer-readable medium described herein may further include operations, features, means, or instructions for determining that the distance may be less than or equal to the resource exclusion parameter associated with the device or the one or more resource exclusion parameters associated with the one or more other devices in the wireless communications system, or a combination thereof, where determining the resources to select for the transmission of the packet may be based on the distance being less than or equal to the resource exclusion parameter associated with the device or the one or more resource exclusion parameters associated with one or more other devices in the wireless communications system, or a combination thereof.

Some examples of the method, apparatuses, and non-transitory computer-readable medium described herein may further include operations, features, means, or instructions for identifying reserved resources of transmissions associated with the one or more other devices in the wireless communications system based on an indication, the resources including at least one of a transmission time interval, and selecting the set of candidate resources for the transmission of the packet that may be non-overlapping with the reserved resources of transmissions associated with the one or more other devices in the wireless communications system based on the distance being less than or equal to the resource exclusion parameter associated with the device or the one or more resource exclusion parameters associated with one or more other devices in the wireless communications system, or a combination thereof.

Some examples of the method, apparatuses, and non-transitory computer-readable medium described herein may further include operations, features, means, or instructions for identifying reserved resources of transmissions associated with the one or more other devices in the wireless communications system based on an indication, and selecting the set of candidate resources for the transmission of the packet that may be overlapping or non-overlapping with reserved resources of transmissions associated with the one or more other devices in the wireless communications system based on the packet having a higher relative priority compared to packets associated with the one or more other devices in the wireless communications system.

In some examples of the method, apparatuses, and non-transitory computer-readable medium described herein, the selected resources for the transmission of the packet may be during a present transmission time interval or during a subsequent transmission time interval.

Some examples of the method, apparatuses, and non-transitory computer-readable medium described herein may further include operations, features, means, or instructions for transmitting, to the one or more other devices in the wireless communications system, control signaling including the resource exclusion parameter.

In some examples of the method, apparatuses, and non-transitory computer-readable medium described herein, the set of parameters includes a transmission range indication for the packet or a QoS of the packet, or a combination thereof.

Some examples of the method, apparatuses, and non-transitory computer-readable medium described herein may further include operations, features, means, or instructions for determining the resource exclusion parameter based on the transmission range indication for the packet or the QoS of the packet, or a combination thereof.

Some examples of the method, apparatuses, and non-transitory computer-readable medium described herein may further include operations, features, means, or instructions for mapping the transmission range indication for the packet or the QoS of the packet, or a combination thereof to the resource exclusion parameter in a candidate set of resource exclusion parameters, where determining the resource exclusion parameter related to the transmission of the packet may be based on the mapping.

Some examples of the method, apparatuses, and non-transitory computer-readable medium described herein may further include operations, features, means, or instructions for determining the resource exclusion parameter based on a mapping of resource exclusion parameters of transmissions associated with the one or more other devices in the wireless communications system.

Some examples of the method, apparatuses, and non-transitory computer-readable medium described herein may further include operations, features, means, or instructions for determining a congestion level related to traffic load in the wireless communications system based on a mapping of resource reservations of transmissions associated with the one or more other devices in the wireless communications system, the resources including at least one of a transmission time interval, where determining the resource exclusion parameter may be based on the congestion level.

In some examples of the method, apparatuses, and non-transitory computer-readable medium described herein, the resource exclusion parameter may be a resource avoidance mechanism to the one or more other devices in the wireless communications system.

DETAILED DESCRIPTION

Figure 1:
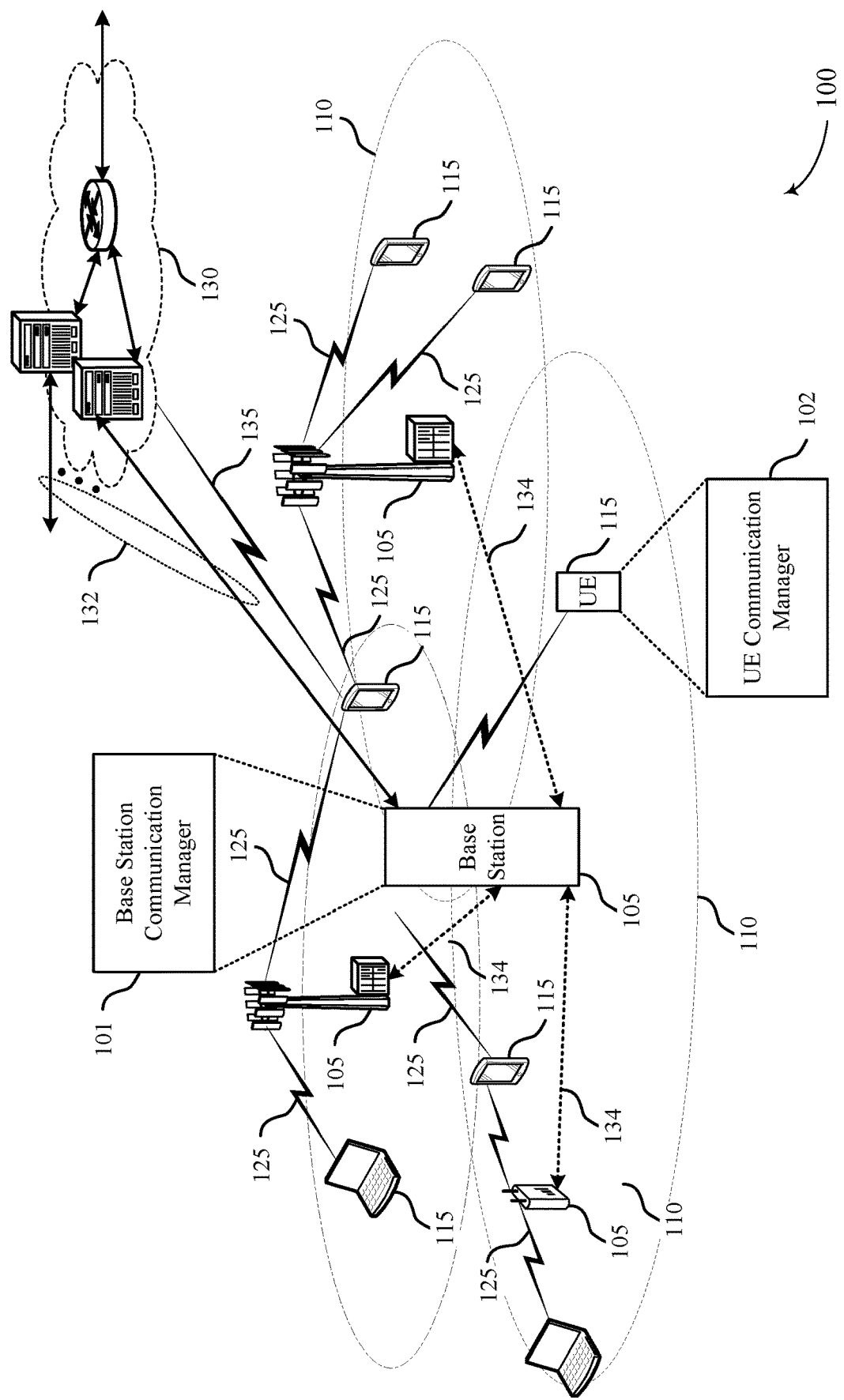
FIGS. 1 and 2 illustrate examples of a wireless communications system that supports distance based resource exclusion for wireless communications in accordance with one or more aspects of the present disclosure.

A wireless communications device in a wireless communications system that supports in-direct or direct communications between wireless communications devices (e.g., direct communications between multiple UEs), such as a D2D system, a V2X system (or other systems such as V2V networks, C-V2X networks, etc.), and the like may select resources for a packet and decrease interference arising from multiple wireless communications devices in close proximity transmitting on matching resources. The wireless communications device may be enabled to select resources for a packet by considering a resource exclusion parameter, such as a distance exclusion value or reference signal received power (RSRP), to support interference avoidance and flexible resource reservation for packets. These techniques may function as a resource avoidance mechanism for other wireless communications devices to avoid using resources that overlap with reserved resources of another wireless communications device.

As part of determining a resource exclusion parameter, the wireless communications device may determine one or more parameters related to a transmission of one or more packets. A parameter may include a packet size, a packet priority, a packet transmission range, a packet reliability indication (e.g., a QoS), among others. The wireless communications device may determine and select a resource exclusion parameter related to the transmission of the one or more packets according to at least one parameter of the possible set of parameters. In some examples, each packet may have a corresponding resource exclusion parameter. To decrease interference in the wireless communications system, the wireless communications device may transmit control signaling to one or more other wireless communications devices in the wireless communications system. The control signaling may include one or more resource exclusion parameters. The other wireless communications devices may receive the control signaling and may use the one or more resource exclusion parameters to avoid using resources that overlap with reserved resources of the wireless communications device.

The wireless communications device may also use the determined resource exclusion parameter to determine resources to select for the transmission of the one or more packets. In some examples, as part of determining resources to select for the packets, the wireless communications device may consider one or more distance exclusion values associated with the other wireless communications devices. For example, the wireless communications device selecting resources for transmission may determine that a distance between itself and another wireless communications device is within a distance defined by the resource exclusion parameter of either the reserving wireless communications device or the other wireless communications device. In this example, the reserving wireless communications device may avoid using resources that overlap with the reserved resources of the other wireless communications device. In alternative examples, the reserving wireless communications device may select resources for the transmission of the packet that do overlap with reserved resources of other wireless communications devices. The wireless communications device may reserve resources that overlap based on factors including, but not limited to, a relative priority of the packets, a reliability indication for the packets, or size of the packets, or a combination thereof.

Aspects of the disclosure are initially described in the context of wireless communications systems. Aspects are then described with respect to resource reservation schemes and process flows that support distance based resource exclusion. Aspects of the disclosure are further illustrated by and described with reference to apparatus diagrams, system diagrams, and flowcharts that relate to distance based resource exclusion for wireless communications.

FIG. 1 illustrates an example of a wireless communications system 100 that supports distance based resource exclusion in accordance with one or more aspects of the present disclosure. The wireless communications system 100 includes base stations 105 (e.g., gNodeBs (gNBs), and/or radio heads (RHs)), UEs 115, and a core network 130. In some examples, the wireless communications system 100 may be an LTE network, an LTE-A network, an LTE-A Pro network, or an NR network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or D2D protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group.

In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 (e.g., eNodeBs (eNBs, network access devices, gNBs) 105-a, gNBs, or access node controllers (ANCs)) may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130). A UE 115 may communicate with the core network 130 through communication link 135.

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an ANC. Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, often in the range of 300 megahertz (MHz) to 300 gigahertz (GHz). The region from 300 MHz to 3 GHz may be known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval. In other cases, a smallest scheduling unit of the wireless communications system 100 may be shorter than a subframe or may be dynamically selected (e.g., in bursts of shortened transmission time intervals or in selected component carriers using shortened transmission time intervals).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or DFT-S-OFDM).

The organizational structure of the carriers may be different for different radio access technologies (e.g., LTE, LTE-A, LTE-A Pro, NR). For example, communications over a carrier may be organized according to transmission time intervals or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or resource blocks (RBs)) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter transmission time interval duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A transmission time interval in eCC may consist of one or multiple symbol periods. In some cases, the transmission time interval duration (that is, the number of symbol periods in a transmission time interval) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

In some wireless communications system 100, such as a V2X system (or other systems such as V2V networks, C-V2X networks, and the like), wireless communications devices may perform autonomous resource selection to schedule data packet transmissions. These wireless communications devices may be examples of UEs 115. In some examples, UEs 115 may be prone to interference when multiple UEs 115 in close proximity (e.g., within a threshold distance) to each other attempt to transmit packets on corresponding resources. By way of example, some UEs 115 may use a measured signal strength (e.g., RSRP) to determine a proximity of another UE 115 or to determine the resource exclusion parameter. Although using measured signal strength may be effective in determining proximity of other UEs 115, there may be occasions where a communication link between UEs 115 is blocked and affecting the measured signal strength. Thereby the UE 115 measuring the signal strength from another UE 115 may erroneously use reserved resources of the other UE 115 for transmission of packets because the measured signal strength may indicate that the other UE 115 is not proximate to the UE 115. To support interference avoidance and efficient resource selection for packets, UEs 115 may be enabled to reliably select resources for packets by considering a distance exclusion value, which may be a resource avoidance mechanism to UEs 115 to refrain from using resources that overlap with reserved resources of another UE 115. Thereby, reducing or eliminating interference between UEs 115 in proximity to each other in the wireless communications system 100.

One or more of the base stations 105 may include a base station communication manager 101, which may support distance based resource exclusion. UEs 115 may include a UE communication manager 102, which may support distance based resource exclusion. For example, a UE communication manager 102 may determine a set of parameters related to a transmission of a packet, determine a resource exclusion parameter related to the transmission of the packet based in part on the set of parameters, and transmit, to one or more additional UEs 115 in the wireless communications system 100, control signaling including the resource exclusion parameter. In some examples, UE communication manager 102 may determine a resource exclusion parameter related to a transmission of a packet based in part on a set of parameters, select resources to select for the transmission of the packet based in part on the distance exclusion value and one or more additional resource exclusion parameter associated with one or more additional UEs 115 in the wireless communications system 100, and reserve the resources for the transmission of the packet based in part on the selecting. The reserved resources for the transmission of the packet may be during a present transmission time interval or during a subsequent transmission time interval.

Therefore, distance based resource exclusion may provide benefits and enhancements to the operation of UEs 115. For example, by enabling UEs 115 to reliably select resources for packets according to a resource exclusion parameter, operational characteristics, such as power consumption, processor utilization, and memory usage related to packet transmission, may be reduced. The distance based resource exclusion may also provide efficiency to UEs 115 by reducing latency associated with processes related to scheduling or selecting resources for packet transmission or packet re-transmission, and more specifically avoiding interference in the wireless communications system 100.

Figure 2:
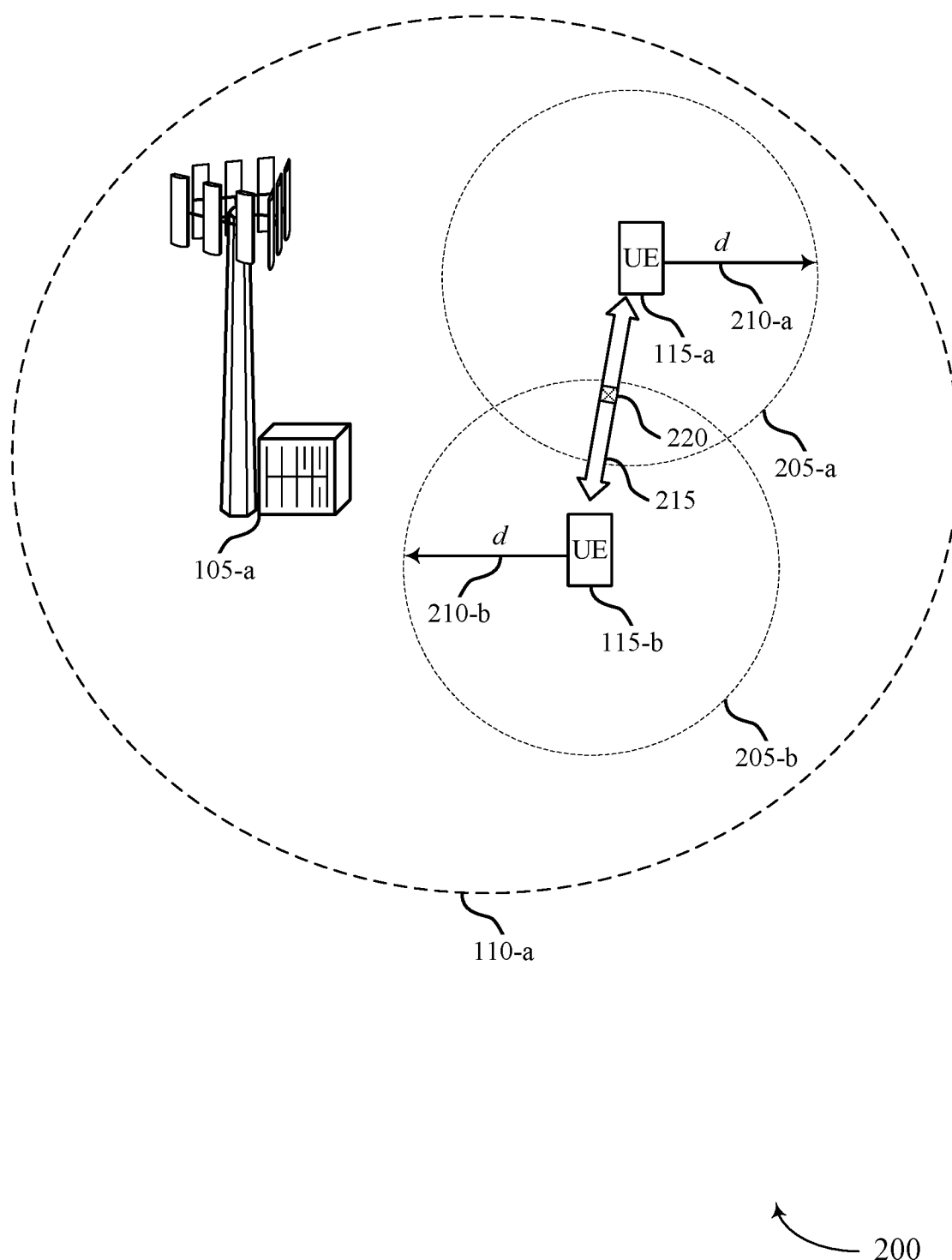

FIG. 2 illustrates an example of a wireless communications system 200 that supports distance based resource exclusion for wireless communications in accordance with one or more aspects of the present disclosure. The wireless communications system 200 may include a base station 105-a, a UE 115-a, and a UE 115-b, which may be examples of the corresponding devices described with reference to FIG. 1. In some examples, the wireless communications system 200 may implement aspects of the wireless communications system 100. For example, the wireless communications system 200 may support interference avoidance and efficient resource selection for packet transmission by enabling the UE 115-a and the UE 115-b to select resources for packets by considering a resource exclusion parameter, along with a relative priority of the packets, a reliability indication for the packets, or size of the packets, or a combination thereof. As a result, by using distance based resource exclusion, interference between the UE 115-a and the UE 115-b may be decreased.

By way of example, the UE 115-a may identify or otherwise determine a packet for transmission. For example, UE 115-a may identify one or more packets for transmission to the base station 105-a via uplink communications or to the UE 115-b via direct communications (e.g., V2X or D2D). When handling interference avoidance, the UE 115-a may determine a resource exclusion parameter, which may be a function of a transmission range or reliability indication, or a combination thereof associated with one or more packets. A resource exclusion parameter may correspond to a resource exclusion zone. In some examples, a distance exclusion value may be a radius of a resource exclusion zone. A resource exclusion zone may be used in a resource avoidance mechanism for other UEs in the wireless communications system 200 to evade using resources that overlap with resources related to a transmission of another UE when the UEs are subject to the resource exclusion zone. In some examples, the resource exclusion parameter is a distance exclusion value.

Each packet may in some examples have an equivalent or different transmission range or a reliability indication (e.g., a QoS), or a combination thereof. For example, a packet with a long transmission range or high QoS indication may have a long distance exclusion value, while a packet with a short transmission range and a low QoS indication may have a short distance exclusion value in order to improve spatial reuse in the wireless communications system 200. In some examples, a distance exclusion value (or a resource exclusion zone) may be based on a congestion level for a given reliability indication (e.g., a QoS) for a packet. For example, a high congestion level (e.g., a congestion level satisfying a threshold) may direct the UE 115-a to use a smaller distance exclusion value to allow for more spatial reuse and in return increase traffic load in the wireless communications system 200. As such, different packets may have varying distance exclusion values.

As part of determining a resource exclusion parameter for a packet (or a set of packets), the UE 115-a may determine a set of parameters related to the transmission of the packet (or the set of packets). For example, UE 115-a may determine a transmission range or a QoS of a packet, or both, to determine a distance exclusion value. In other examples, UE 115-a may determine a number of resources selected by other UEs (e.g., UE 115-b), a number of resources that fit a packet resource indication (e.g., a number of transmission time intervals, a number of resource blocks, etc.), a ratio of packets in a same priority that either drop or cannot be transmitted with a required number of retransmissions due to lack of resources, or a combination thereof. In some examples, the UE 115-a may map a transmission range indication for a packet or a QoS of a packet, or a combination thereof, to a resource exclusion parameter in a candidate set of resource exclusion parameters. The candidate set of resource exclusion parameter may include resource exclusion parameters that satisfy the transmission range indication for the packet or the QoS of the packet, or a combination thereof. For example, UE 115-a may determine a resource exclusion parameter 210-a based on mapping a transmission range indication for a packet or a QoS of a packet, or both, to the distance exclusion value 210-a in a candidate set of resource exclusion parameters.

A candidate set of resource exclusion parameters may be configured in a relational database, a bitmap, a table, or the like. In some examples, the candidate set of resource exclusion parameters may also include resource exclusion parameters (determined, selected) of other UEs. For example, UEs in the wireless communications system 200 may share resource exclusion parameters with other UEs. In this example, sharing a distance exclusion value is defined as transmitting via control signaling the resource exclusion parameter to other UEs. In other examples, UEs may share their resource exclusion parameter with a network device (e.g., base station 105-a), which may collect, index, and store resource exclusion parameters in a relational database, a bitmap, a table, or the like. UEs may therefore receive this information (e.g., resource exclusion parameters) from the network device (e.g., base station 105-a).

By way of example, UE 115-a may receive information, including resource exclusion parameters of other UEs 115, from the base station 105-a or directly from the other UEs 115 via direct communications (e.g., D2D communications, vehicle-based communications, which may also be referred to as V2X networks, V2V networks, C-V2X networks, and the like). The base station 105-a may perform a connection procedure (e.g., a radio resource control procedure, such as a cell acquisition procedure, a random access procedure, a radio resource control connection procedure, a radio resource control configuration procedure, etc.) with the UE 115-a. Base station 105-a may provide communication coverage for a respective geographic coverage area 110-a following the connection procedure. As part of, or following, the connection procedure, the base station 105-a may also transmit the information in the form of a relational database, a bitmap, a table, or the like, which maps resource exclusion parameters to corresponding UEs 115 in the wireless communications system 200.

Alternatively, or additionally, UEs 115 may maintain and update dynamically a relational database, a bitmap, a table, or the like mapping resource exclusion parameters to corresponding UEs 115 in the wireless communications system 200. For example, UE 115-a may receive, via direct communications (e.g., D2D communications, vehicle-based communications, V2X networks, V2V networks, C-V2X networks, or the like) control signaling including resource exclusion parameters associated with the UE 115-b, and if necessary, update a relational database, a bitmap, a table, or the like that maps the distance exclusion values to the UE 115-b.

In some examples, UE 115-a may determine a congestion level according to at least one parameter of the set of parameters. For example, UE 115-a may determine a congestion level based at least in part on a transmission range indication for a packet, a QoS of a packet, a number of resources selected by other UEs 115 (e.g., UE 115-b), a number of resources that fit a packet resource indication (e.g., a number of transmission time intervals, a number resource blocks, etc.), a ratio of packets in a same priority that either drop or cannot be transmitted with a required number of retransmissions due to lack of resources to a total number of packets, or a combination thereof. The UE 115-a may map the congestion level to a congestion index value, which may correspond to a certain distance exclusion value for the UE 115-a. The congestion index value corresponding to a distance exclusion value may be configured by the UE 115-a or network-configured (e.g., by the base station 105-a). For example, UE 115-a may map a congestion index value to a corresponding the required number of retransmission (e.g., the required number of retransmission 210-a) in a relational database, which may reside locally in the UE 115-a.

Alternatively, in some examples, either or both of a transmission range or a QoS may be in the form of an index value, which the UE 115-a may map to a resource exclusion parameter in a database, a table, or the like. For example, UE 115-a may map a transmission range index value to a corresponding resource exclusion parameter (e.g., resource exclusion parameter 210-a) in a relational database, which may reside locally in the UE 115-a. Additionally, or alternatively, the UE 115-a may map a QoS index value to a corresponding resource exclusion parameter (e.g., resource exclusion parameter 210-a) in a relational database. In some examples, a transmission range or a QoS may map to a range of resource exclusion parameters of a candidate set of resource exclusion parameters, and the UE 115-a may select a resource exclusion parameter from the candidate set based on another parameter, for example, a relative priority of the packet or a size of the packet, or a combination thereof. Thereby, UE 115-a is capable of mapping to different resource exclusion parameters in accordance with a transmission range index value or a QoS index value, or a combination thereof. That is, different QoS may have varying resource demands (e.g., number of transmission resource blocks, number of aggregated transmission time intervals per transmission, number of transmissions, etc.). As such, QoS index values (classes) that require more resources may see the wireless communications system 200 more congested compared to other QoS index values (classes), allowing UE 115-a to select a resource exclusion parameter along with reserving appropriate resources for packet transmissions.

In the wireless communications system 200, UE positions may be known to a group or a subgroup of UEs. UEs, in the wireless communications system 200, may share position information (e.g., UE location) periodically or a-periodically. For example, UE 115-a may share its position information with the UE 115-b according to a periodic or aperiodic schedule. Similarly, the UE 115-b may share its position information with the UE 115-*a*. In some examples, as part of the resource exclusion parameter determination, the UE 115-*a* may use both the set of parameters (e.g., transmission range, QoS, priority, packet size, and the like) related to a packet and UE position information. For example, a transmission range or a QoS relating to a packet may map to a range of resource exclusion parameters of a candidate set of resource exclusion parameters, and the UE 115-*a* may select a resource exclusion parameter from the candidate set based on its position information and position information of UE 115-*b*. In some examples, the UE 115-*a* may select a resource exclusion parameter according to an absolute distance between the UE 115-*a* and the UE 115-*b* that may be determined based at least in part on the position information of the UEs. In this example, the UE 115-*a* may determine a set of candidate resource exclusion parameters based on mapping the transmission range or QoS of the packet, or both, to an entry in a relational database, a bitmap, a table, or the like. The UE 115-*a* may then select a resource exclusion parameter (e.g., resource exclusion parameter 210-*a*) from the set based on proximity (e.g., distance) to other UEs in the wireless communications system 200.

Subsequently to determining and selecting a resource exclusion parameter 210-*a*, the UE 115-*a* may transmit, to one or more additional UEs including the UE 115-*b*, control signaling including the resource exclusion parameter 210-*b*. For example, the UE 115-*a* may transmit control signaling 220 including the resource exclusion parameter 210-*b* to the UE 115-*b* via direct communication link 215. The control signaling may include control information, which may be a bit field, for example, in a packet header or packet payload. Although FIG. 2 explains the UE 115-*a* perspective, the UE 115-*b* may also perform same, similar or different operations to determine a resource exclusion parameter 210-*b*, which may correspond to a resource exclusion zone 205-*b*. In some examples, resource exclusion parameters related to the UE 115-*a* and the UE 115-*b* may be equal or different in value (e.g., length, distance, measurement), as described in more detail in FIGS. 3A through 3C and 4A through 4C.

As part of determining (and selecting) a resource exclusion parameter, UEs may determine resources to selected for transmission of one or more packets. A UE may be restricted to selecting resources based at least in part on a resource exclusion parameter of the UE, one or more resource exclusion parameters of one or more other UEs, a priority of a packet, a QoS of a packet, a size of a packet, or a congestion level (or congestion index value), and the like. A resource may span both time and frequency resources, for example, such as a resource block, a subgroup of resource blocks, a group of resource blocks, a modulation symbol, a transmission time interval, a slot, and the like. In some examples, a UE may in addition to using its resource exclusion parameter, it may also consider other resource exclusion parameters of other UEs in the wireless communications system 200 or a congestion index value that may indicate to the UE that for higher priority packets the UE can ignore resources selected by lower priority packets, or the like. For example, UE 115-*a* may determine one or more resources to select for transmission of one or more packets according to the resource exclusion parameter 210-*a* and one or more additional resource exclusion parameters (e.g., resource exclusion parameter 210-*b* of UE 115-*b*). UEs may also evaluate one or more resources to select for transmission of one or more packets according to distances to other UEs. For example, UE 115-*a* may determine one or more resources for the transmission of one or more packets based on a distance between the UE 115-*a* and the UE 115-*b*.

In some examples, because a UE may be restricted to selecting resources based in part on a distance between the UE and one or more other UEs, and the like, if the distance between the UE is less than or equal to a resource exclusion parameter of the UE and/or a resource exclusion parameter of another UE, the resources may not overlap with reserved resources of the other UE. For example, if a distance between the UE 115-*a* and the UE 115-*b* is less than or equal to a maximum of the resource exclusion parameter 210-*a* and the resource exclusion parameter 210-*b*, the resources for transmission of one or more packets cannot overlap with reserved resources of the UE 115-*b*. This safeguards that transmission ranges and reliability indication (e.g., QoS) for packets may be satisfied for both of UEs. For example, if selected resources of the UE 115-*a* and the UE 115-*b* overlap and a distance between the UE 115-*a* and UE 115-*b* is smaller than or equal to the resource exclusion parameter 210-*a*, then a transmission range and reliability indication for packets transmitted by the UE 115-*a* cannot be fulfilled. Alternatively, if selected resources of the UE 115-*a* and the UE 115-*b* overlap and a distance between the UE 115-*a* and UE 115-*b* is less than or equal to the resource exclusion parameter 210-*b*, then a transmission range and reliability indication for packets transmitted by the UE 115-*b* may not be satisfied.

By way of example, the UE 115-*a* may determine that a distance between the UE 115-*a* and the UE 115-*b* is less than or equal to the resource exclusion parameter 210-*a* and the resource exclusion parameter 210-*b*. The UE 115-*a* may reference a resource allocation map, which may be in the form of a database, a table, or the like to determine available resources for transmission of one or more packets. In some examples, the resource allocation map may include an indication of reserved resources by other UEs (e.g., UE 115-*b*) in the wireless communications system 200. The resource allocation map may also include an indication of a starting resource location (e.g., a starting resource block) for transmission of one or more packets. As such, the UE 115-*a* may determine available resources according to reserved resources in the resource allocation map that the UE 115-*a* may select for the transmission of one or more packets that are overlapping or non-overlapping with the reserved resources of transmissions associated with other UEs. The UE 115-*a* may transmit the packets on the reserved overlapping or non-overlapping resources.

In some examples, additionally, or alternatively, a UE may select resources for transmission of one or more packets that are overlapping with reserved resources of transmissions associated with other UEs based on a priority of the one or more packets, and the like. For example, UE 115-*a* may, according to determined reserved resources of the UE 115-*b*, select resources for the transmission of one or more packets that are overlapping with the reserved resources when one or more packets of the UE 115-*a* have a higher relative priority compared to one or more packets of the UE 115-*b*. The UE 115-*a* may transmit the packets on the reserved overlapping resources. In some examples, the UE 115-*a* may select resources and transmit one or more packets on the selected resources. In another example, the UE 115-*a* may select resources, reserve the selected resources, and then transmit one or more packets on the reserved resources.

Accordingly, distance based resource exclusion may provide benefits and enhancements to the operation of a UE. For example, by enabling a UE to reliably select resources for packets according to a resource exclusion parameter, operational characteristics, such as power consumption, processor utilization, and memory usage related to packet transmission may be reduced. Distance based resource exclusion may also provide efficiency to a UE by reducing latency associated with processes related to selecting resources for packet transmission or packet re-transmission, and more specifically avoiding interference in a wireless communications system.

Figure 3A:
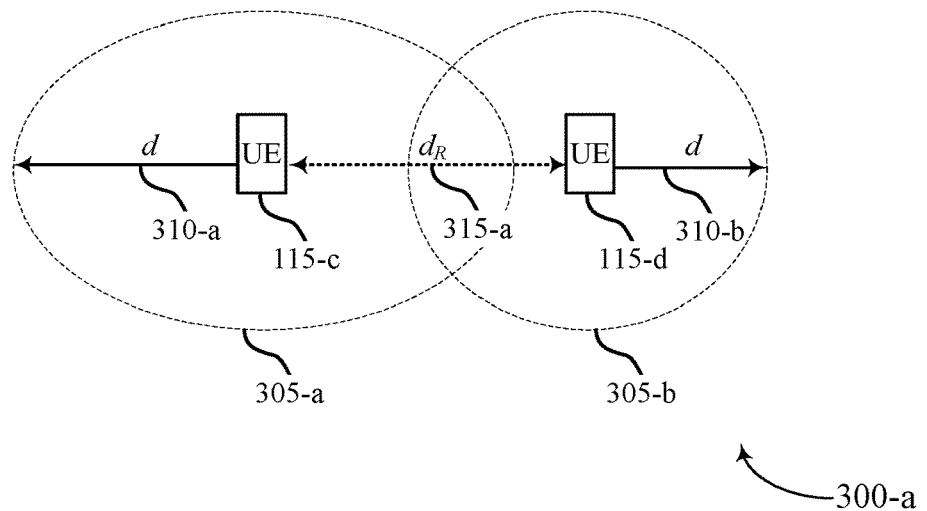
FIGS. 3A through 3C illustrate an example of a resource reservation scheme that supports distance based resource exclusion for wireless communications in accordance with one or more aspects of the present disclosure.
Figure 3B:
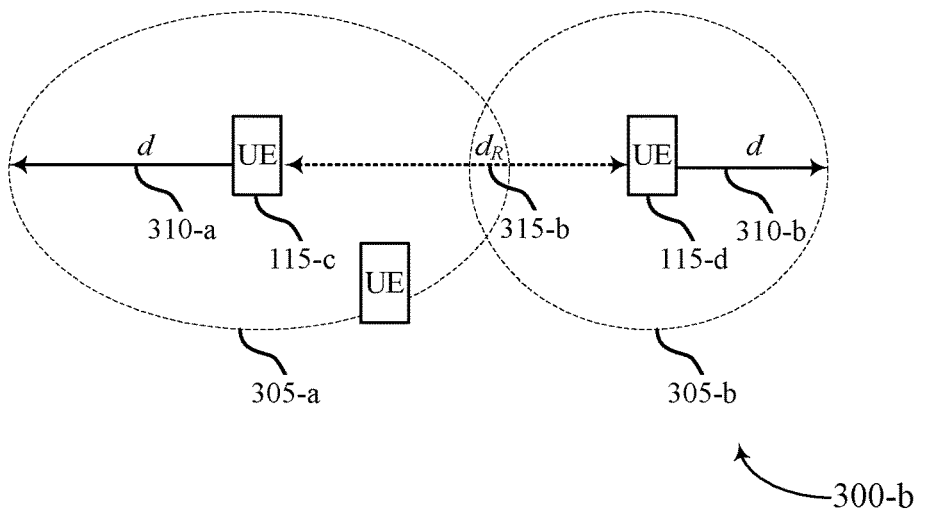
Figure 3C:
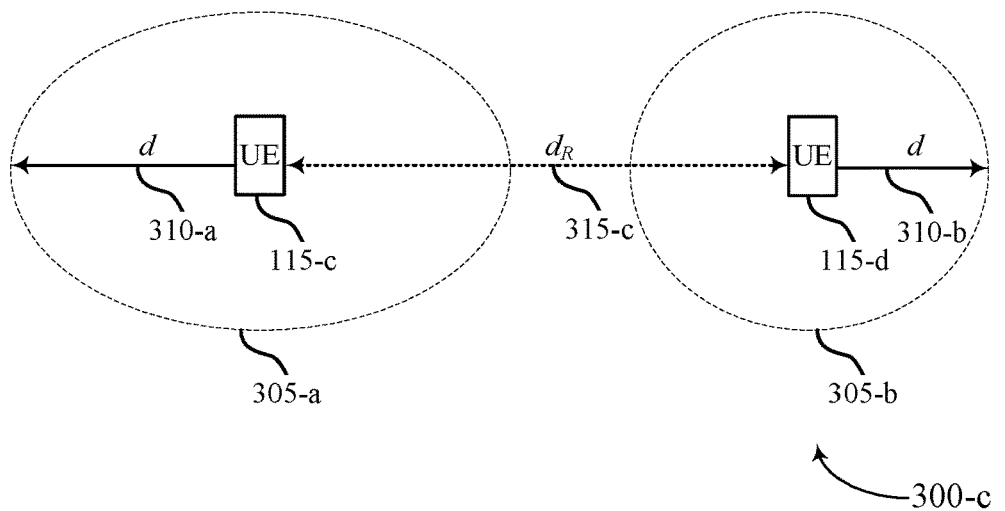

FIGS. 3A through 3C illustrate examples of resource reservation schemes 300-a through 300-c that support distance based resource exclusion for wireless communications in accordance with one or more aspects of the present disclosure. In some examples, resource selection schemes 300-a through 300-c may implement aspects of the wireless communications systems 100 or 200. For example, resource selection schemes 300-a through 300-c may support interference avoidance and efficient resource reservation for packets by enabling a UE 115-c and a UE 115-d, which may be examples of corresponding UEs in FIGS. 1 and 2, to select resources for packets in accordance with a resource exclusion parameter or a distance between the UE 115-e and the UE 115-f, or a combination thereof.

With reference to FIGS. 3A through 3C, the UE 115-c may determine and assign a resource exclusion parameter 310-a having a resource exclusion zone 305-a, while the UE 115-d may determine and assign a resource exclusion parameter 310-b having a resource exclusion zone 305-b. In the examples of FIGS. 3A through 3C, the resource exclusion parameter 310-a may be 1000 meters (m), while the resource exclusion parameter 310-b may be 500 m.

In some examples, the UE 115-c may have a packet to transmit, for example, to another UE or to the UE 115-d. Similarly, the UE 115-d may also have a packet to transmit or have ongoing packet transmissions. Prior to transmitting the packet, the UE 115-c may determine resources to select for transmission of the packet, as explained with reference to FIG. 2. As part of determining resources to select, the UE 115-c may evaluate a distance between the UE 115-c and the UE 115-d. For example, with reference to FIG. 3A, the UE 115-c may determine or identify a distance 315-a between the UE 115-c and the UE 115-d. The distance 315-a may be, for example, 400 m. In another example, with reference to FIG. 3B, the UE 115-c may determine or identify a distance 315-b between the UE 115-c and the UE 115-d. The distance 315-b may be, for example, 750 m. In other examples, with reference to FIG. 3C, the UE 115-c may determine or identify a distance 315-c between the UE 115-c and the UE 115-d. The distance 315-c may be, for example, 1250 m.

Subsequently to determining a distance between the UE 115-c and the UE 115-d, the UE 115-c may determine whether the distance is less than or equal to the resource exclusion parameter 310-a and the resource exclusion parameter 310-b. When the distance is less than or equal to the resource exclusion parameter 310-a and the resource exclusion parameter 310-b, the UE 115-c may refrain from reserving resources that overlap with resources of the UE 115-d. The UE 115-c may additionally, or alternatively, evaluate a priority of the packet associated with the UE 115-c, as well as a priority of a packet associated with the UE 115-d when reserving resources. In some examples, the UE 115-c may determine that a packet of the UE 115-c and a packet of the UE 115-d have at least one of a same priority, a lower priority, or a higher priority when compared to each other.

With reference to FIG. 3A, irrespective of whether a packet of the UE 115-c and a packet of the UE 115-d share a same priority, or the packet of the UE 115-c has a lower or higher priority compared to the packet of UE 115-d, the UE 115-c may refrain from reserving resources that overlap with resources of the packet of the UE 115-d. That is, the UE 115-c may avoid reserving resources that overlap with resources of the packet of the UE 115-d because the distance 315-a between the UE 115-c and the UE 115-d may be smaller than or equal to the resource exclusion parameter 310-a and the resource exclusion parameter 310-b.

With reference to FIG. 3B, similarly irrespective of whether a packet of the UE 115-c and a packet of the UE 115-d share a same priority, or the packet of the UE 115-c has a lower or higher priority compared to the packet of UE 115-d, the UE 115-c may refrain from selecting resources that overlap with resources of the packet associated with the UE 115-d. That is, the UE 115-c may avoid selecting resources that overlap with resources of the packet associated with the UE 115-d because the distance 315-a between the UE 115-c and the UE 115-d may be less than or equal to the resource exclusion parameter 310-a.

With reference to FIG. 3C, again irrespective of whether a packet of the UE 115-c and a packet of the UE 115-d share a same priority, or the packet of the UE 115-c has a lower or higher priority compared to the packet of UE 115-d, the UE 115-c may select resources that overlap with reserved resources of the packet associated with the UE 115-d since the distance 315-c between the UE 115-c and the UE 115-d is greater than the resource exclusion parameter 310-a and the resource exclusion parameter 310-b.

Accordingly, distance based resource exclusion may provide benefits and enhancements to the operation of a UE. For example, by enabling a UE to more reliably select or reserve resources for packets according to a resource exclusion parameter, operational characteristics, such as power consumption, processor utilization, and latency related to packet transmission may be reduced.

Figure 4A:
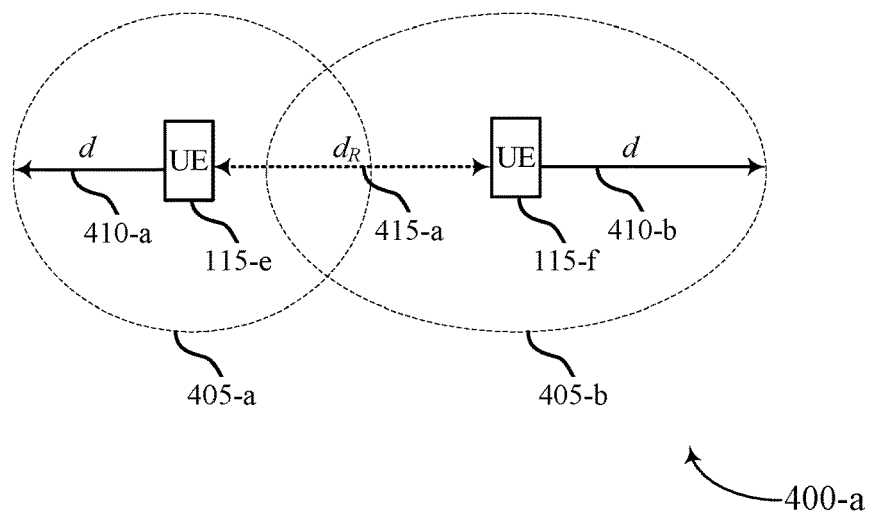
FIGS. 4A through 4C illustrate an example of a resource reservation scheme that supports distance based resource exclusion for wireless communications in accordance with one or more aspects of the present disclosure.
Figure 4B:
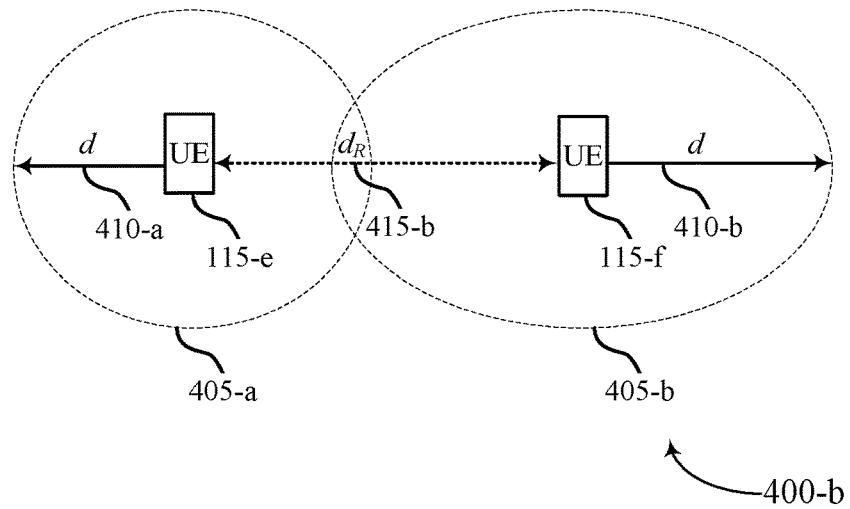
Figure 4C:
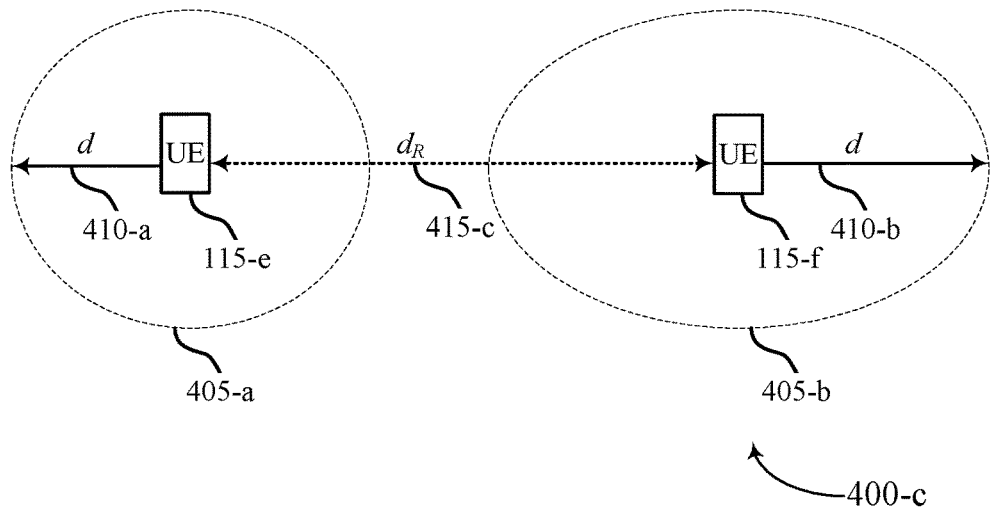

FIGS. 4A through 4C illustrate examples of resource reservation schemes 400-a through 400-c that support distance based resource exclusion for wireless communications in accordance with one or more aspects of the present disclosure. In some examples, resource selection schemes 400-a through 400-c may implement aspects of the wireless communications systems 100 or 200. For example, resource selection schemes 400-a through 400-c may support interference avoidance and efficient resource selection for packets by enabling a UE 115-e and a UE 115-f, which may be examples of corresponding UEs in FIGS. 1 and 2, to select resources for packets in accordance with a resource exclusion parameter or a distance between the UE 115-e and the UE 115-f, or a combination thereof.

With reference to FIGS. 4A through 4C, the UE 115-e may determine and assign a resource exclusion parameter 410-a having a resource exclusion zone 405-a, while the UE 115-f may determine and assign a resource exclusion parameter 410-b having a resource exclusion zone 405-b. In the examples of FIGS. 4A through 4C, the resource exclusion parameter 410-a may be 500 m, while the resource exclusion parameter 410-b may be 1000 m.

The UE 115-e may have a packet to transmit, for example, to another UE or to the UE 115-f. Correspondingly, the UE 115-e may also have a packet for transmission. Prior to transmitting a packet, the UE 115-e may determine resources for transmission of the packet, as explained with reference to FIG. 2. As part of determining resources to select, the UE 115-e may evaluate a distance between the UE 115-e and the UE 115-f. For example, with reference to FIG. 4A, the UE 115-e may determine or identify a distance 415-a between the UE 115-e and the UE 115-f. The distance 415-a may be, for example, 400 m. In another example, with reference to FIG. 4B, the UE 115-e may determine or identify a distance 415-*b* between the UE 115-*e* and the UE 115-*f*. The distance 415-*b* may be, for example, 750 m. In other examples, with reference to FIG. 4C, the UE 115-*e* may determine or identify a distance 415-*c* between the UE 115-*e* and the UE 115-*f*. The distance 415-*c* may be, for example, 1250 m.

After determining a distance between the UE 115-*e* and the UE 115*4*, the UE 115-*e* may determine whether the distance is less than or equal to the resource exclusion parameter 410-*a* and the resource exclusion parameter 410-*b* of the UE 115-*f*. When the distance is less than or equal to the resource exclusion parameter 410-*a* and the resource exclusion parameter 410-*b* of the UE 115-*f*, the UE 115-*e* may refrain from selecting resources that overlap with selected resources of the UE 115-*f*. The UE 115-*e* may additionally, or alternatively, evaluate a priority of the packet associated with the UE 115-*e*, as well as a priority of a packet associated with the UE 115-*f* when selecting resources. In some examples, the UE 115-*e* may determine that a packet of the UE 115-*e* and a packet of the UE 115-*f* have at least one of a same priority, a lower priority, or a higher priority when compared to each other.

With reference to FIG. 4A, irrespective of a packet of the UE 115-*e* and a packet of the UE 115-*f* sharing a same priority, or the packet of the UE 115-*e* having a lower priority compared to the packet of UE 115-*f*, or the packet of the UE 115-*e* having a higher priority compared to the packet of UE 115-*f*, the UE 115-*e* may refrain from selecting resources that overlap with reserved resources of the UE 115-*f*. That is, the UE 115-*e* may avoid selecting resources that overlap with reserved resources of a packet of the UE 115-*f*, because the distance 415-*a* between the UE 115-*e* and the UE 115-*f* is smaller than or equal to the resource exclusion parameter 410-*a* and the resource exclusion parameter 410-*b*.

With reference to FIG. 4B, the UE 115-*e* may avoid selecting resources that overlap with reserved resources of the UE 115-*f* when a packet of the UE 115-*e* and a packet of the UE 115-*f* share a same priority, or when the packet of the UE 115-*e* has a lower priority compared to the packet of the UE 115-*f*. Alternatively, if the packet of the UE 115-*e* has a higher priority compared to the packet of the UE 115*4*, the UE 115-*e* may select resources that overlap with reserved resources of the packet associated with the UE 115-*f*, the distance 415-*a* between the UE 115-*e* and the UE 115-*f* being smaller than or equal to the resource exclusion parameter 410-*b*, as long as the distance 415-*a* is larger than the resource exclusion parameter 410-*a*.

With reference to FIG. 4C, the packet of the UE 115-*e* may have a higher priority compared to a priority of the packet of the UE 115-*f*, and the distance 415-*c* between the UE 115-*e* and the UE 115-*f* may be greater than the resource exclusion parameter 410-*a* and the resource exclusion parameter 410-*b*. In this example, the UE 115-*e* may select resources that overlap with reserved resources of the UE 115-*f* because the distance 415-*c* between the UE 115-*e* and the UE 115-*f* is greater than the resource exclusion parameter 410-*a* and the resource exclusion parameter 410-*b*.

Therefore distance based resource exclusion may provide enhancements to the operation of a UE. For example, by enabling a UE to select or reserve resources for packets according to a resource exclusion parameter, operational characteristics, such as power consumption, processor utilization, and latency related to packet transmission may be reduced. Distance based resource exclusion may also provide efficiency to a UE by reducing latency associated with processes related to selecting resources for packet transmission or packet re-transmission, and more specifically avoiding interference in a wireless communications system.

Figure 5:
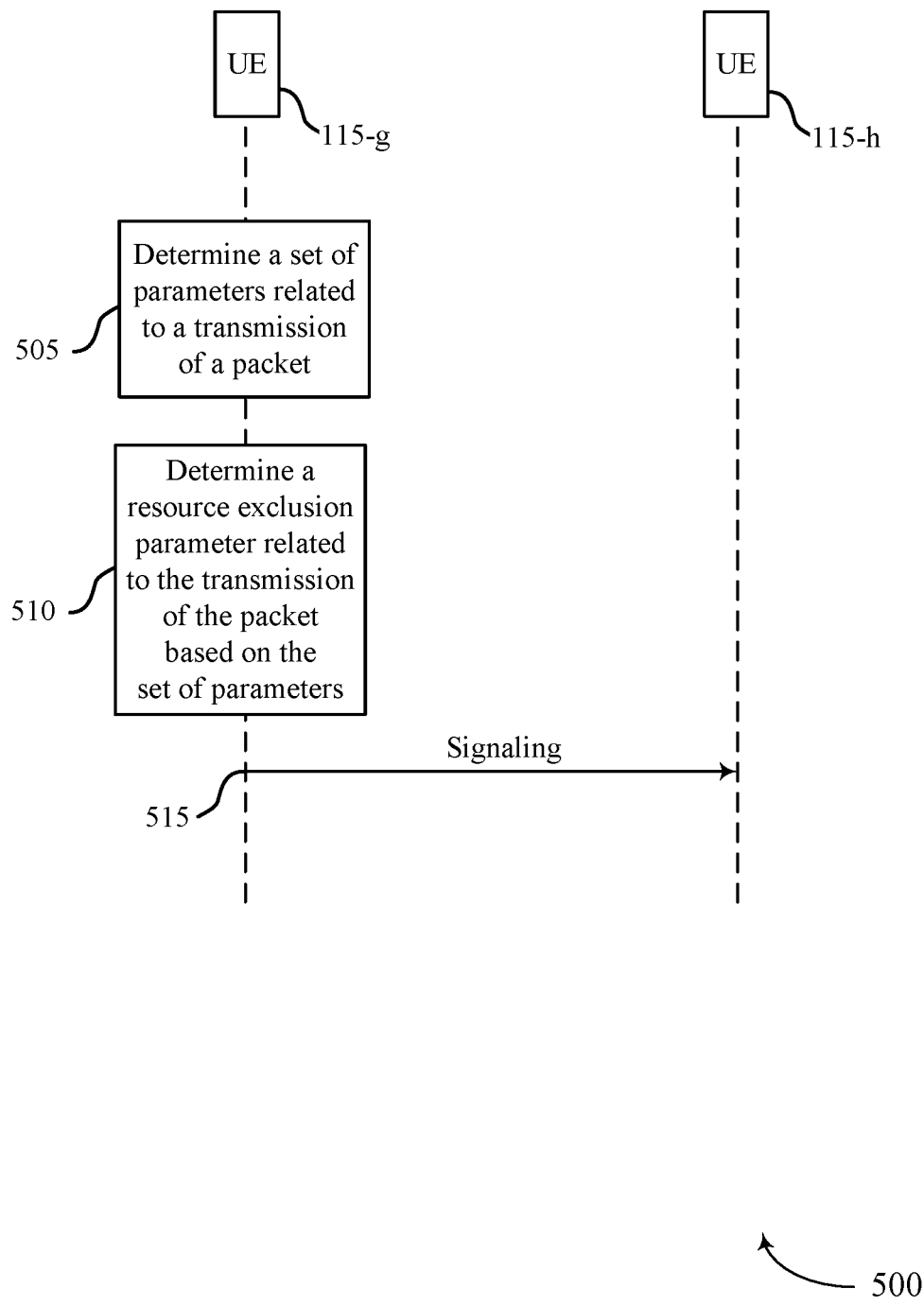
FIG. 5 illustrates an example of a process flow that supports distance based resource exclusion for wireless communications in accordance with one or more aspects of the present disclosure.

FIG. 5 illustrates an example of a process flow 500 that supports distance based resource exclusion for wireless communications in accordance with one or more aspects of the present disclosure. In some examples, the process flow 500 may implement aspects of wireless communications systems 100 or 200. The process flow 500 may include a UE 115-*g* and a UE 115-*h*, which may be examples of the corresponding devices described with reference to FIGS. 1 and 2. In the following description of the process flow 500, the operations between the UE 115-*g* and the UE 115-*h* may be transmitted in a different order than the example order shown, or the operations performed by the UE 115-*g* and the UE 115-*h* may be performed in different orders or at different times. Certain operations may also be omitted from the process flow 500, and/or other operations may be added to the process flow 500.

At 505, the UE 115-*g* may determine a set of parameters related to a transmission of a packet. For example, the UE 115-*g* may determine a transmission range indication for the packet, a QoS of the packet, or a priority of the packet, or a combination thereof. At 510, the UE 115-*g* may determine a resource exclusion parameter related to the transmission of the packet based on the set of parameters. For example, the UE 115-*g* may determine a resource exclusion parameter related to the transmission of the packet based on a transmission range indication for the packet, a QoS of the packet, or a priority of the packet, or a combination thereof. At 515, the UE 115-*g* may transmit signaling including the resource exclusion parameter. For example, the UE 115-*g* transmit control signaling including the resource exclusion parameter to the UE 115-*h* via direct communications (e.g., V2X or D2D).

Therefore, the present disclosure may provide improvements to resource interference avoidance. Furthermore, the techniques described herein may provide benefits and enhancements to the operation of the UE 115-*g* and the UE 115-*h*. For example, by enabling control signaling of a resource exclusion parameter, operational characteristics, such as power consumption, processor utilization, and memory usage related to packet transmission scheduling (e.g., selecting resources) may be reduced. Distance based resource exclusion may also provide efficiency to the UE 115-*g* and the UE 115-*h* by reducing latency associated with processes related to scheduling or selecting resources for packet transmission or packet re-transmission, and more specifically avoiding interference in a wireless communications system.

Figure 6:
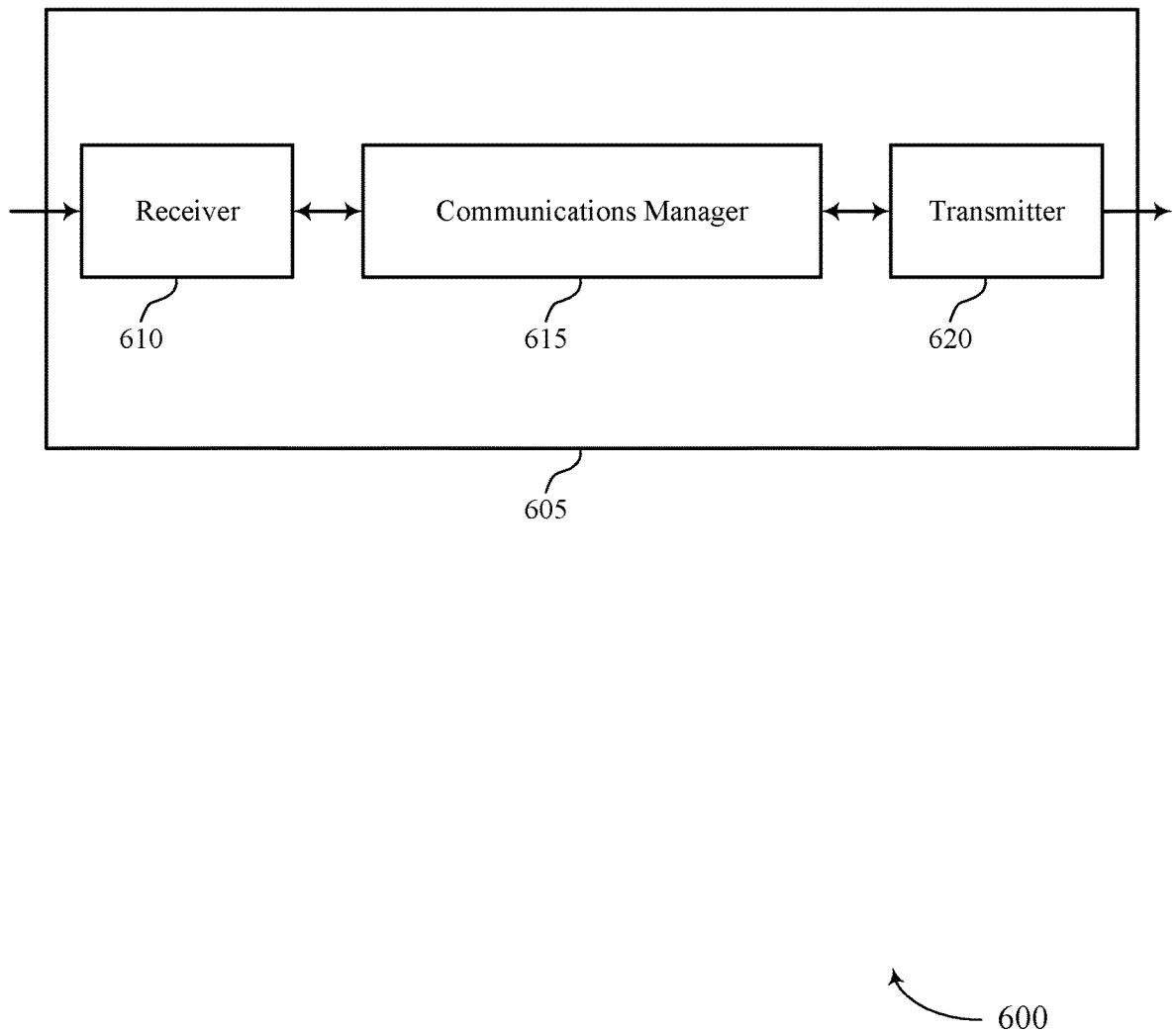
FIGS. 6 and 7 show block diagrams of devices that support distance based resource exclusion in accordance with one or more aspects of the present disclosure.

FIG. 6 shows a block diagram 600 of a device 605 that supports distance based resource exclusion in accordance with one or more aspects of the present disclosure. The device 605 may be an example of aspects of a device as described herein. The device 605 may include a receiver 610, a communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to distance based resource exclusion, etc.). Information may be passed on to other components of the device 605. The receiver 610 may be an example of aspects of the transceiver 920 described with reference to FIG. 9. The receiver 610 may utilize a single antenna or a set of antennas.

The communications manager 615 may determine a set of parameters related to a transmission of a packet, determine a resource exclusion parameter related to the transmission of the packet based on the set of parameters, and transmit, to one or more other devices in the wireless communications system, control signaling including the resource exclusion parameter. The communications manager 615 may also determine a resource exclusion parameter related to a transmission of a packet based on a set of parameters, determine resources to select for the transmission of the packet based on the resource exclusion parameter and one or more resource exclusion parameters associated with one or more other devices in the wireless communications system, and select the resources for the transmission of the packet based on the determining. The communications manager 615 may be an example of aspects of the communications manager 910, the base station communication manager 101, or the UE communication manager 102 as described herein.

The communications manager 615, or its sub-components, may be implemented in hardware, code (e.g., software or firmware) executed by a processor, or any combination thereof. If implemented in code executed by a processor, the functions of the communications manager 615, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 615, or its sub-components, may be physically located at various positions, including being distributed such that portions of functions are implemented at different physical locations by one or more physical components. In some examples, the communications manager 615, or its sub-components, may be a separate and distinct component in accordance with various aspects of the present disclosure. In some examples, the communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

Figure 7:
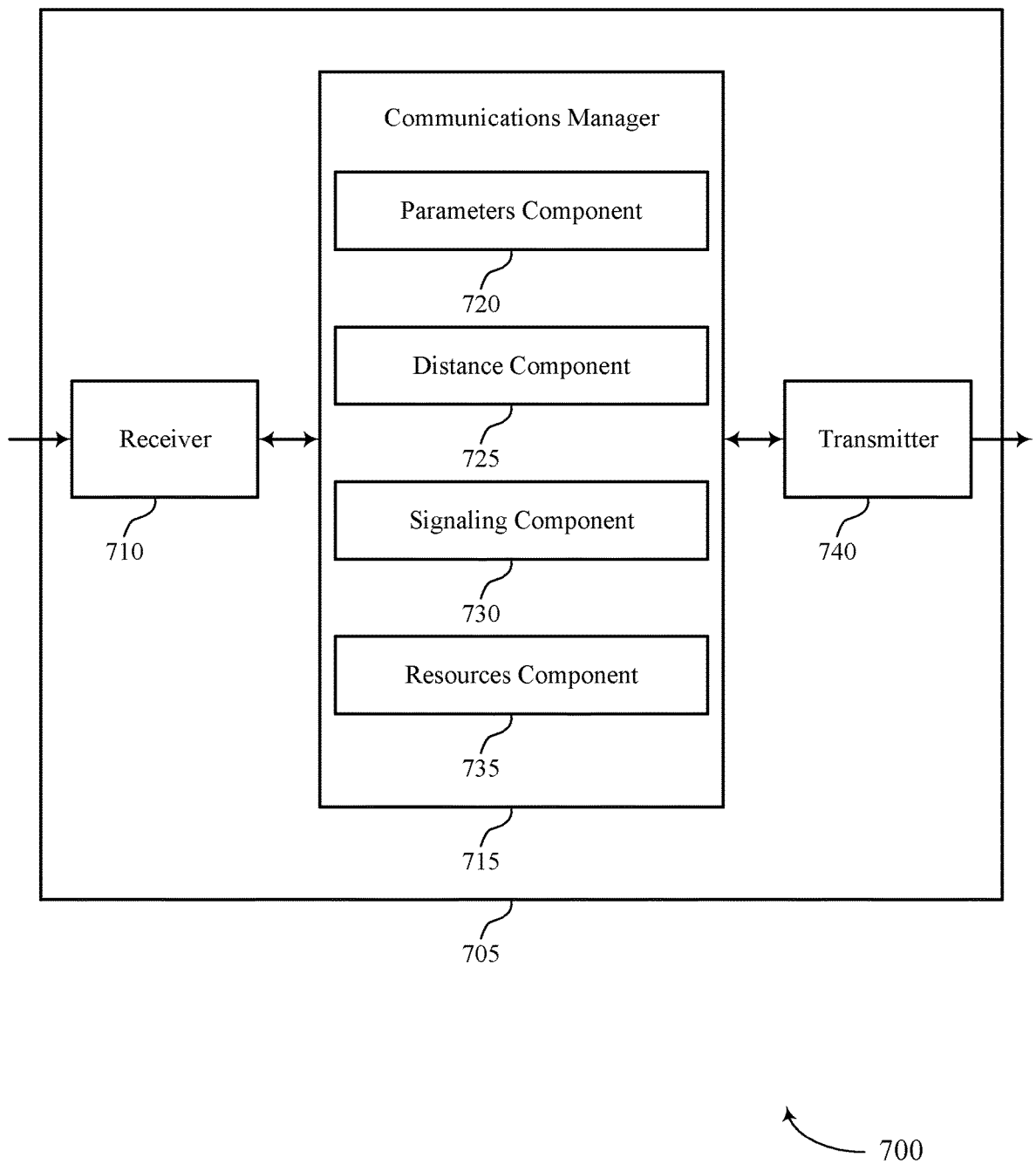

FIG. 7 shows a block diagram 700 of a device 705 that supports distance based resource exclusion in accordance with one or more aspects of the present disclosure. The device 705 may be an example of aspects of a device 605 or a device 115 as described herein. The device 705 may include a receiver 710, a communications manager 715, and a transmitter 740. The device 705 may also include a processor. Each of these components may be in communication with one another (e.g., via one or more buses).

The receiver 710 may receive information such as packets, user data, or control information associated with various information channels (e.g., control channels, data channels, and information related to distance based resource exclusion, etc.). Information may be passed on to other components of the device 705. The receiver 710 may be an example of aspects of the transceiver 920 described with reference to FIG. 9. The receiver 710 may utilize a single antenna or a set of antennas.

The communications manager 715 may be an example of aspects of the communications manager 615 as described herein. The communications manager 715 may include a parameters component 720, a distance component 725, a signaling component 730, and a resources component 735. The communications manager 715 may be an example of aspects of the communications manager 910, the base station communication manager 101, or the UE communication manager 102 as described herein.

The parameters component 720 may determine a set of parameters related to a transmission of a packet. The distance component 725 may determine a resource exclusion parameter related to the transmission of the packet based on the set of parameters. The signaling component 730 may transmit, to one or more other devices in the wireless communications system, control signaling including the resource exclusion parameter. The distance component 725 may determine a resource exclusion parameter related to a transmission of a packet based on a set of parameters. The resources component 735 may determine resources to reserve for the transmission of the packet based on the resource exclusion parameter and one or more resource exclusion parameters associated with one or more other devices in the wireless communications system and reserve the resources for the transmission of the packet based on the determination.

The transmitter 740 may transmit signals generated by other components of the device 705. In some examples, the transmitter 740 may be collocated with a receiver 710 in a transceiver module. For example, the transmitter 740 may be an example of aspects of the transceiver 920 described with reference to FIG. 9. The transmitter 740 may utilize a single antenna or a set of antennas.

Figure 8:
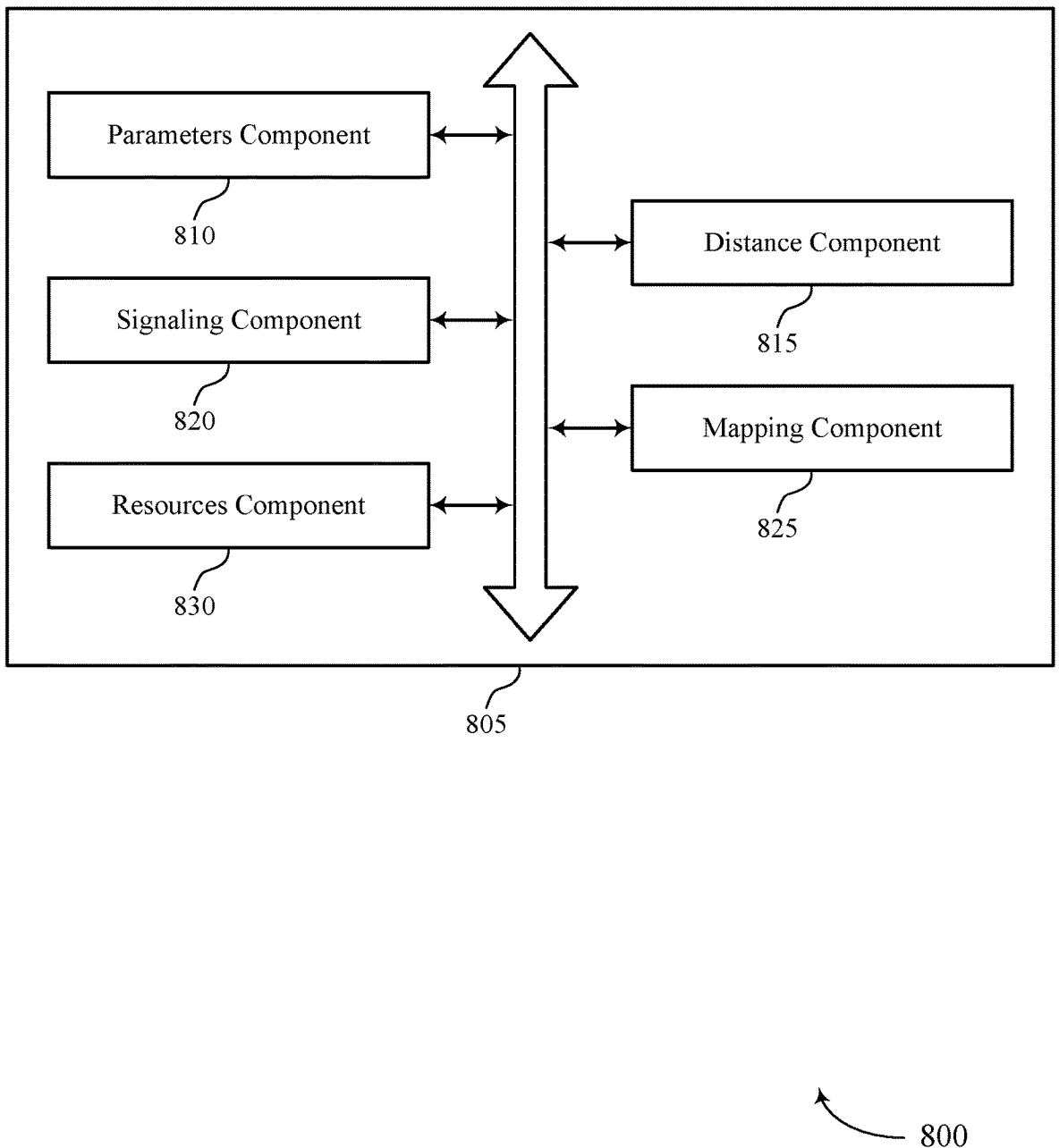
FIG. 8 shows a block diagram of a communications manager that supports distance based resource exclusion in accordance with one or more aspects of the present disclosure.

FIG. 8 shows a block diagram 800 of a communications manager 805 that supports distance based resource exclusion in accordance with one or more aspects of the present disclosure. The communications manager 805 may be an example of aspects of a communications manager 615, a communications manager 715, the base station communication manager 101, the UE communication manager 102, or a communications manager 910 described herein. The communications manager 805 may include a parameters component 810, a distance component 815, a signaling component 820, a mapping component 825, and a resources component 830. Each of these modules may communicate, directly or indirectly, with one another (e.g., via one or more buses).

The parameters component 810 may determine a set of parameters related to a transmission of a packet. In some examples, the parameters component 810 may determine a transmission range indication for the packet or a QoS of the packet, or a combination thereof. In some examples, the parameters component 810 may determine a congestion level related to traffic load in the wireless communications system based on a resource unavailability, a packet size, or a packet priority, a QoS of the packet, or a mapping of one or more resource reservations of one or more transmissions associated with the one or more other devices in the wireless communications system, or a combination thereof, the one or more resources reserved including one or more transmission time intervals. In some cases, the set of parameters includes a transmission range indication for the packet, a QoS of the packet, or a priority of the packet, or a combination thereof.

The distance component 815 may determine a resource exclusion parameter related to the transmission of the packet based on the set of parameters. In some examples, the distance component 815 may determine a resource exclusion parameter related to a transmission of a packet based on a set of parameters. In some examples, the distance component 815 may determine the resource exclusion parameter based on the transmission range indication for the packet or the QoS of the packet, or a combination thereof.

In some examples, the distance component 815 may determine a distance between the device and the one or more other devices in the wireless communications system, where determining the resources to select for the transmission of the packet is based on the distance between the device and the one or more other devices in the wireless communications system. The distance component 815 may determine that the distance is less than or equal to the resource exclusion parameter associated with the device or the one or more resource exclusion parameters associated with the one or more other devices in the wireless communications system, or a combination thereof, where determining the resources to select for the transmission of the packet is based on the distance being less than or equal to the resource exclusion parameter associated with the device or the one or more resource exclusion parameters associated with one or more other devices in the wireless communications system, or a combination thereof. The resource exclusion parameter may be used in a resource avoidance mechanism to the one or more other devices in the wireless communications system.

The signaling component 820 may transmit, to one or more other devices in the wireless communications system, control signaling including the resource exclusion parameter. In some examples, the signaling component 820 may include, in the control signaling, information including a position of the device within the wireless communications system. The signaling component 820 may transmit, to the one or more other devices in the wireless communications system, control signaling including the resource exclusion parameter.

The resources component 830 may select resources for the transmission of the packet based on the resource exclusion parameter and one or more resource exclusion parameters associated with one or more other devices in the wireless communications system. In some examples, the resources component 830 may reserve the resources for the transmission of the packet based on the selection. In some examples, the resources component 830 may select resources of transmissions associated with the one or more other devices in the wireless communications system based on an indication, the resources including at least one of a transmission time interval.

In some examples, the resources component 830 may select resources for the transmission of the packet that are non-overlapping with the reserved resources of transmissions associated with the one or more other devices in the wireless communications system based on the distance being less than or equal to the resource exclusion parameter associated with the device or the one or more resource exclusion parameters associated with one or more other devices in the wireless communications system, or a combination thereof.

In some examples, the resources component 830 may determine reserved resources of transmissions associated with the one or more other devices in the wireless communications system based on an indication. In some examples, the resources component 830 may select resources for the transmission of the packet that are overlapping or non-overlapping with reserved resources of transmissions associated with the one or more other devices in the wireless communications system based on the packet having a higher relative priority compared to packets associated with the one or more other devices in the wireless communications system. In some cases, the reserved resources for the transmission of the packet are during a present transmission time interval or during a subsequent transmission time interval.

The mapping component 825 may map the transmission range indication for the packet or the QoS of the packet, or a combination thereof to the resource exclusion parameter in a candidate set of resource exclusion parameters, where determining the resource exclusion parameter related to the transmission of the packet is based on the mapping. In some examples, the mapping component 825 may determine the resource exclusion parameter based on a mapping of one or more resource exclusion parameters of one or more transmissions associated with the one or more other devices in the wireless communications system. The mapping component 825 may map the congestion level to a congestion index value, where determining the resource exclusion parameter is based on the congestion index value. In some examples, the mapping component 825 may determine a congestion level related to traffic load in the wireless communications system based on a mapping of resource reservations of transmissions associated with the one or more other devices in the wireless communications system, the resources including at least one of a transmission time interval, where determining the resource exclusion parameter is based on the congestion level.

Figure 9:
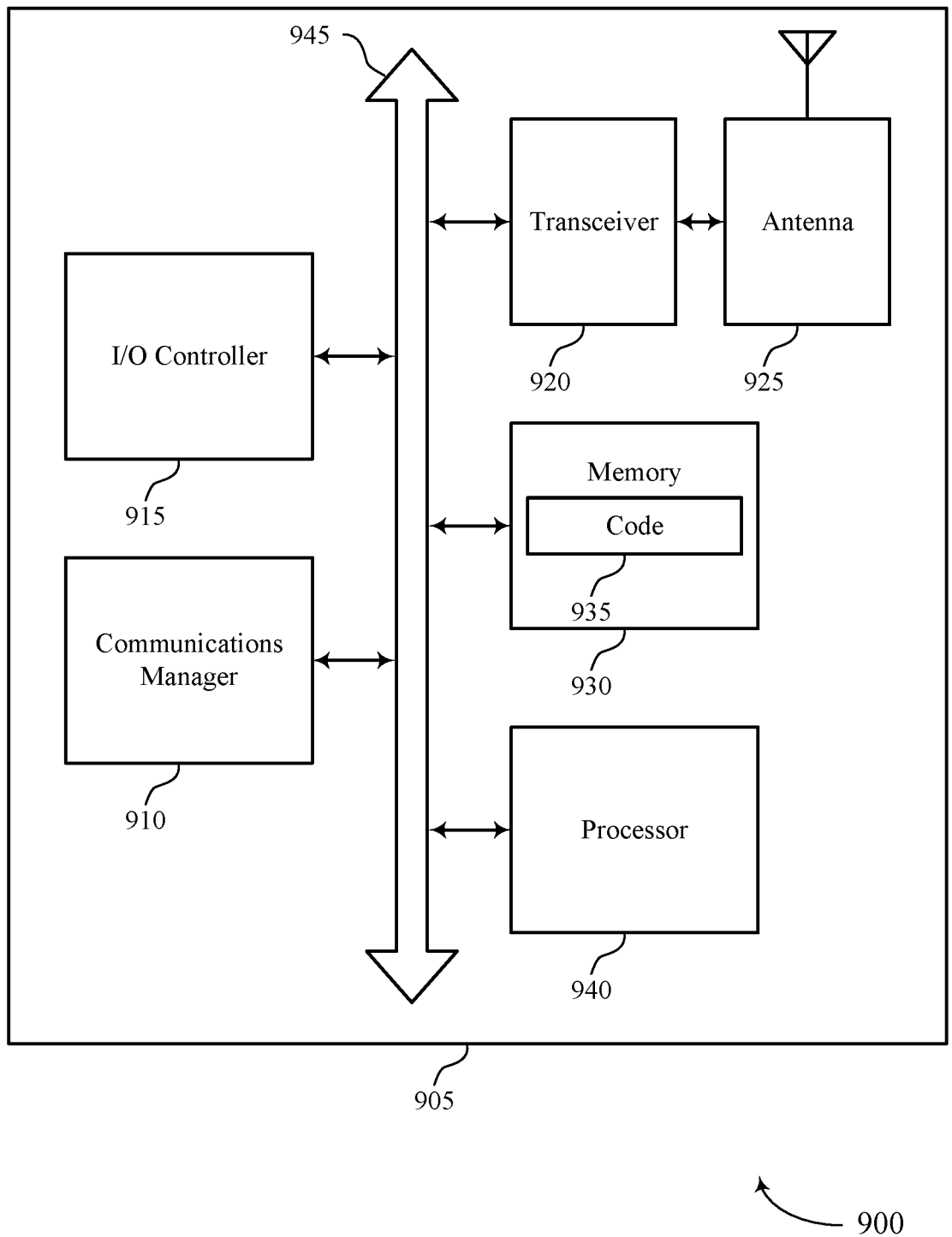
FIG. 9 shows a diagram of a system including a device that supports distance based resource exclusion in accordance with one or more aspects of the present disclosure.

FIG. 9 shows a diagram of a system 900 including a device 905 that supports distance based resource exclusion in accordance with one or more aspects of the present disclosure. The device 905 may be an example of or include the components of device 605, device 705, or a device as described herein. The device 905 may include components for bi-directional voice and data communications including components for transmitting and receiving communications, including a communications manager 910, an I/O controller 915, a transceiver 920, an antenna 925, memory 930, and a processor 940. These components may be in electronic communication via one or more buses (e.g., bus 945).

The communications manager 910 may determine a set of parameters related to a transmission of a packet, determine a resource exclusion parameter related to the transmission of the packet based on the set of parameters, and transmit, to one or more other devices in the wireless communications system, control signaling including the resource exclusion parameter. The communications manager 910 may also determine a resource exclusion parameter related to a transmission of a packet based on a set of parameters, select resources to select for the transmission of the packet based on the resource exclusion parameter and one or more resource exclusion parameters associated with one or more other devices in the wireless communications system, and reserve the resources for the transmission of the packet based on the selection.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS, ANDROID, MS-DOS, MS-WINDOWS, OS/2, UNIX, LINUX, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described above. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas. In some cases, the device 905 may include a single antenna 925. However, in some cases the device 905 may have more than one antenna 925, which may be capable of concurrently transmitting or receiving multiple wireless transmissions.

The memory 930 may include RAM and ROM. The memory 930 may store computer-readable, computer-executable code 935 including instructions that, when executed, cause the processor to perform various functions described herein. In some cases, the memory 930 may contain, among other things, a basic input/output system (BIOS) which may control basic hardware or software operation such as the interaction with peripheral components or devices.

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

The processor 940 may include an intelligent hardware device, (e.g., a general-purpose processor, a DSP, a central processing unit (CPU), a microcontroller, an ASIC, a FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting distance based resource exclusion).

Figure 10:
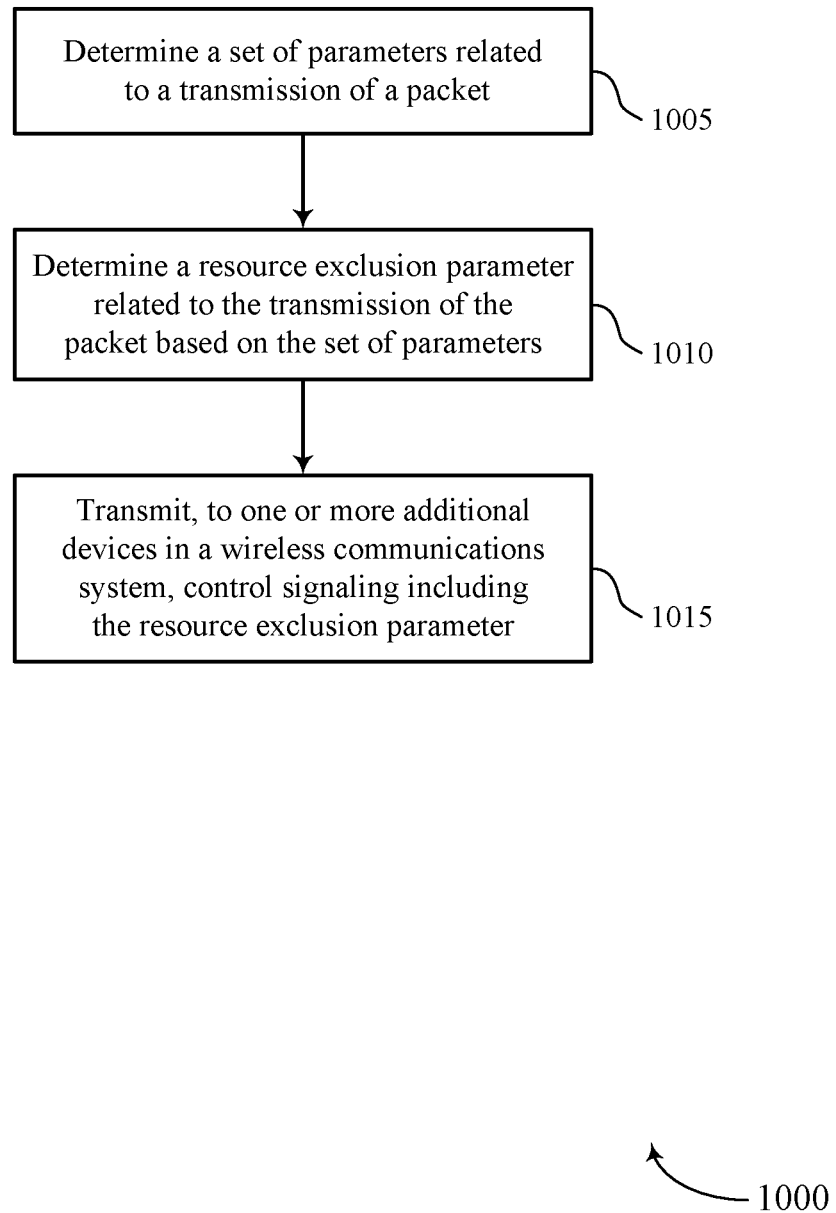
FIGS. 10 through 14 show flowcharts illustrating methods that support distance based resource exclusion in accordance with one or more aspects of the present disclosure.

FIG. 10 shows a flowchart illustrating a method 1000 that supports distance based resource exclusion in accordance with one or more aspects of the present disclosure. The operations of method 1000 may be implemented by a device or its components as described herein. For example, the operations of method 1000 may be performed by a communications manager as described with reference to FIGS. 1 and 6 through 9. In some examples, a device may execute a set of instructions to control the functional elements of the device to perform the functions described below. Additionally or alternatively, a device may perform aspects of the functions described below using special-purpose hardware.

At 1005, the device may determine a set of parameters related to a transmission of a packet. The operations of 1005 may be performed according to the methods described herein. In some examples, aspects of the operations of 1005 may be performed by a parameters component as described with reference to FIGS. 1 and 6 through 9.

At 1010, the device may determine a resource exclusion parameter related to the transmission of the packet based on the set of parameters. The operations of 1010 may be performed according to the methods described herein. In some examples, aspects of the operations of 1010 may be performed by a distance component as described with reference to FIGS. 1 and 6 through 9.

At 1015, the device may transmit, to one or more other devices in a wireless communications system, control signaling including the resource exclusion parameter. The operations of 1015 may be performed according to the methods described herein. In some examples, aspects of the operations of 1015 may be performed by a signaling component as described with reference to FIGS. 1 and 6 through 9.

Figure 11:
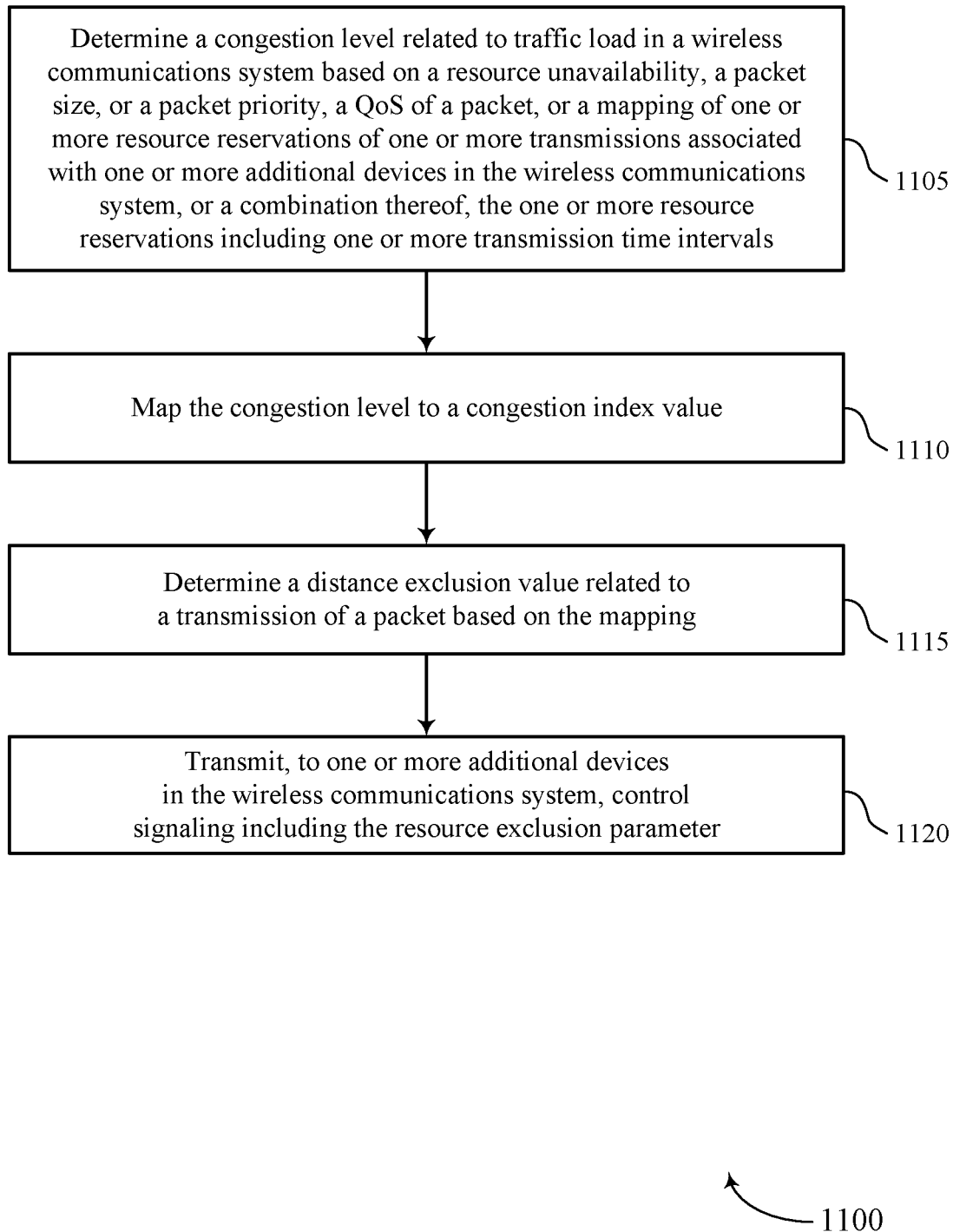

FIG. 11 shows a flowchart illustrating a method 1100 that supports distance based resource exclusion in accordance with one or more aspects of the present disclosure. The operations of method 1100 may be implemented by a device or its components as described herein. For example, the operations of method 1100 may be performed by a communications manager as described with reference to FIGS. 1 and 6 through 9. In some examples, a device may execute a set of instructions to control the functional elements of the device to perform the functions described below. Additionally or alternatively, a device may perform aspects of the functions described below using special-purpose hardware.

At 1105, the device may determine a congestion level related to traffic load in a wireless communications system based on a resource unavailability, a packet size, or a packet priority, a QoS of a packet, or a mapping of one or more resource reservations of one or more transmissions associated with the one or more other devices in the wireless communications system, or a combination thereof, the one or more resources reserved including one or more transmission time intervals. The operations of 1105 may be performed according to the methods described herein. In some examples, aspects of the operations of 1105 may be performed by a parameters component as described with reference to FIGS. 1 and 6 through 9.

At 1110, the device may map the congestion level to a congestion index value. The operations of 1110 may be performed according to the methods described herein. In some examples, aspects of the operations of 1110 may be performed by a mapping component as described with reference to FIGS. 1 and 6 through 9.

At 1115, the device may determine a resource exclusion parameter related to a transmission of a packet based on the mapping. The operations of 1115 may be performed according to the methods described herein. In some examples, aspects of the operations of 1115 may be performed by a distance component as described with reference to FIGS. 1 and 6 through 9.

At 1120, the device may transmit, to one or more other devices in the wireless communications system, control signaling including the resource exclusion parameter. The operations of 1120 may be performed according to the methods described herein. In some examples, aspects of the operations of 1120 may be performed by a signaling component as described with reference to FIGS. 1 and 6 through 9.

Figure 12:
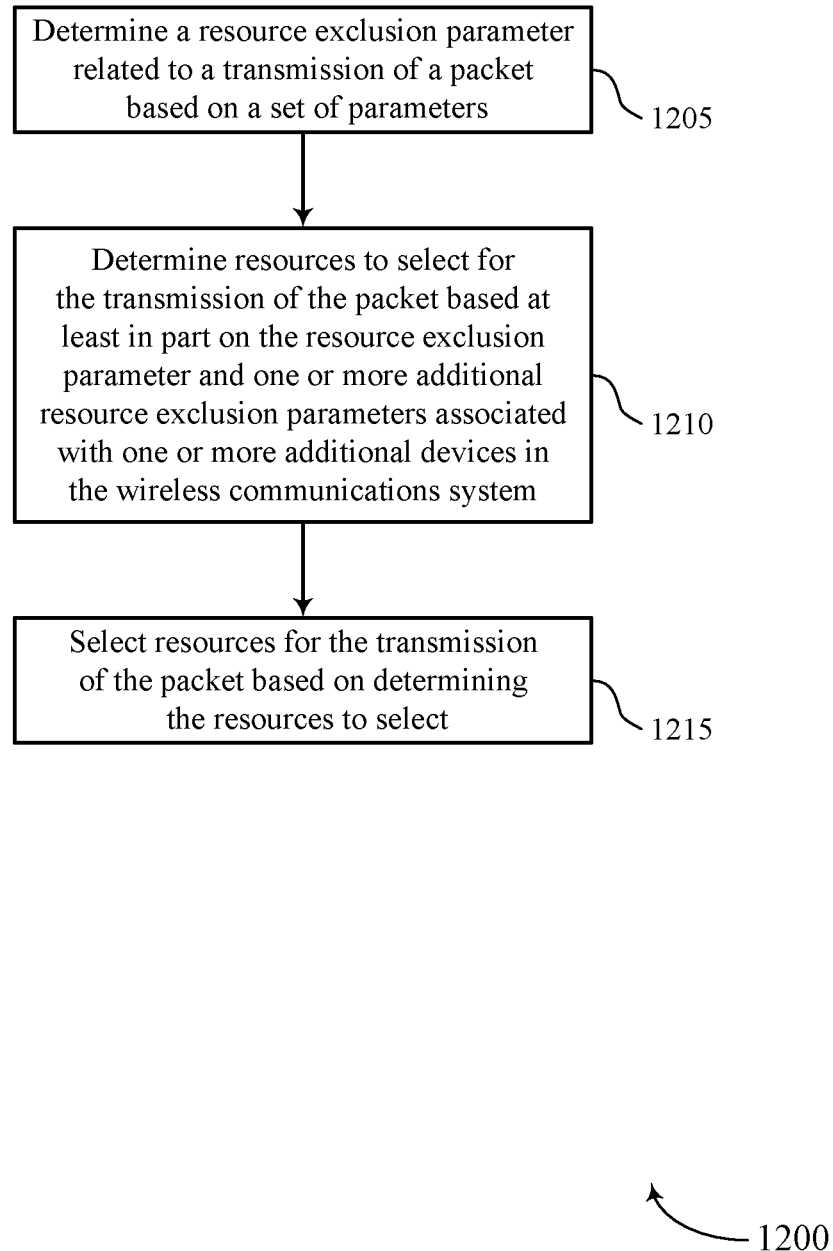

FIG. 12 shows a flowchart illustrating a method 1200 that supports distance based resource exclusion in accordance with one or more aspects of the present disclosure. The operations of method 1200 may be implemented by a device or its components as described herein. For example, the operations of method 1200 may be performed by a communications manager as described with reference to FIGS. 1 and 6 through 9. In some examples, a device may execute a set of instructions to control the functional elements of the device to perform the functions described below. Additionally or alternatively, a device may perform aspects of the functions described below using special-purpose hardware.

At 1205, the device may determine a resource exclusion parameter related to a transmission of a packet based on a set of parameters. The operations of 1205 may be performed according to the methods described herein. In some examples, aspects of the operations of 1205 may be performed by a distance component as described with reference to FIGS. 1 and 6 through 9.

At 1210, the device may determine resources to select for the transmission of the packet based on the resource exclusion parameter and one or more resource exclusion parameters associated with one or more other devices in the wireless communications system. The operations of 1210 may be performed according to the methods described herein. In some examples, aspects of the operations of 1210 may be performed by a resources component as described with reference to FIGS. 1 and 6 through 9.

At 1215, the device may select resources for the transmission of the packet based on the determination. The operations of 1215 may be performed according to the methods described herein. In some examples, aspects of the operations of 1215 may be performed by a resources component as described with reference to FIGS. 1 and 6 through 9.

Figure 13:
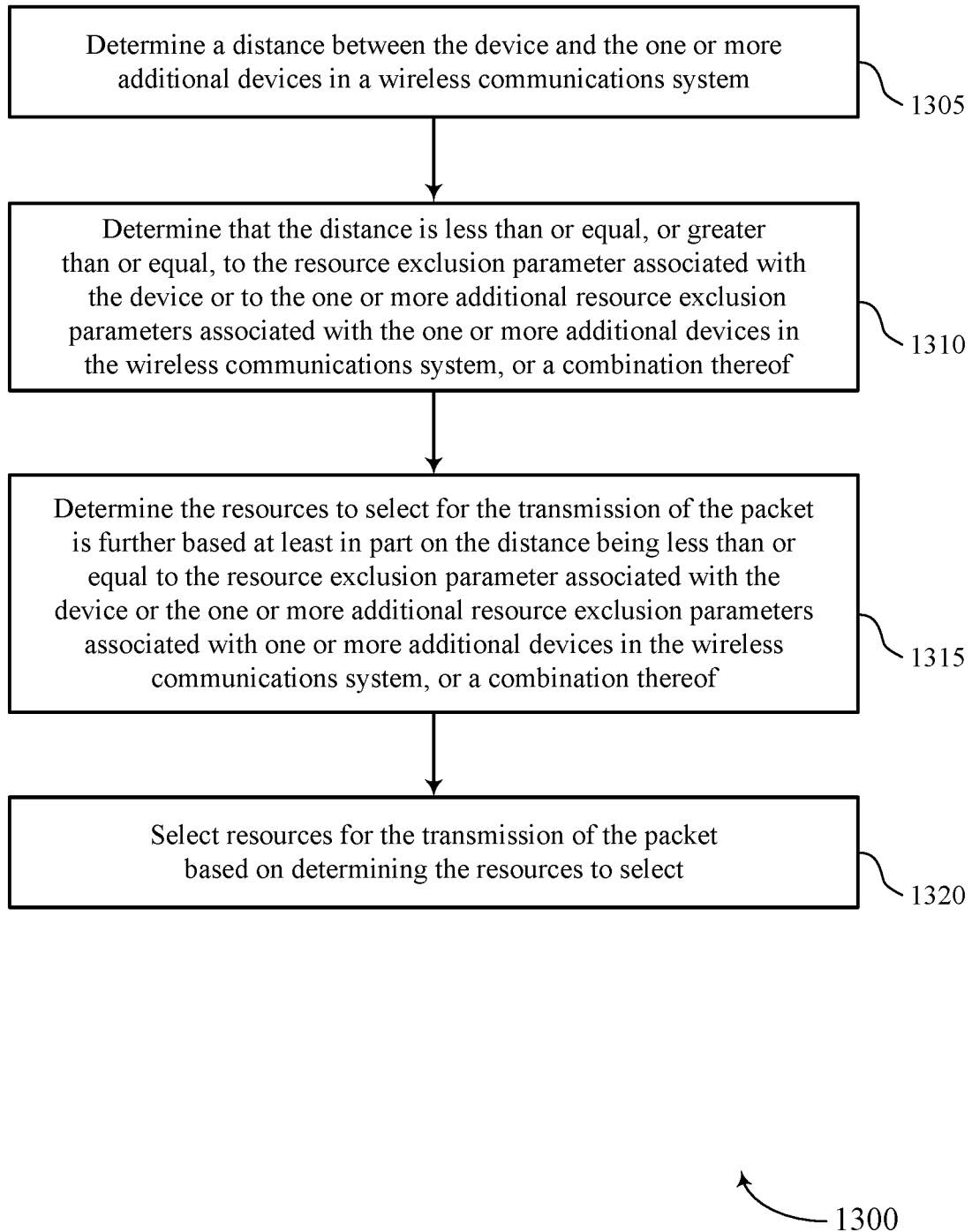

FIG. 13 shows a flowchart illustrating a method 1300 that supports distance based resource exclusion in accordance with one or more aspects of the present disclosure. The operations of method 1300 may be implemented by a device or its components as described herein. For example, the operations of method 1300 may be performed by a communications manager as described with reference to FIGS. 1 and 6 through 9. In some examples, a device may execute a set of instructions to control the functional elements of the device to perform the functions described below. Additionally or alternatively, a device may perform aspects of the functions described below using special-purpose hardware.

At 1305, the device may determine a distance between the device and one or more other devices in a wireless communications system, where determining the resources to select for the transmission of the packet is based on the distance between the device and the one or more other devices in the wireless communications system. The operations of 1305 may be performed according to the methods described herein. In some examples, aspects of the operations of 1305 may be performed by a distance component as described with reference to FIGS. 1 and 6 through 9

At 1310, the device may determine that the distance is less than or equal to a resource exclusion parameter associated with the device or one or more resource exclusion parameters associated with the one or more other devices in the wireless communications system, or a combination thereof. In some examples, aspects of the operations of 1310 may be performed by a distance component as described with reference to FIGS. 1 and 6 through 9.

At 1315, the device may determine the resources to select for the transmission of the packet based on based on the distance being less than or equal to a resource exclusion parameter associated with the device or one or more resource exclusion parameters associated with one or more other devices in a wireless communications system, or a combination thereof. The operations of 1315 may be performed according to the methods described herein. In some examples, aspects of the operations of 1315 may be performed by a resources component as described with reference to FIGS. 1 and 6 through 9.

At 1320, the device may select resources for the transmission of the packet based on the determination. The operations of 1320 may be performed according to the methods described herein. In some examples, aspects of the operations of 1320 may be performed by a resources component as described with reference to FIGS. 1 and 6 through 9.

Figure 14:
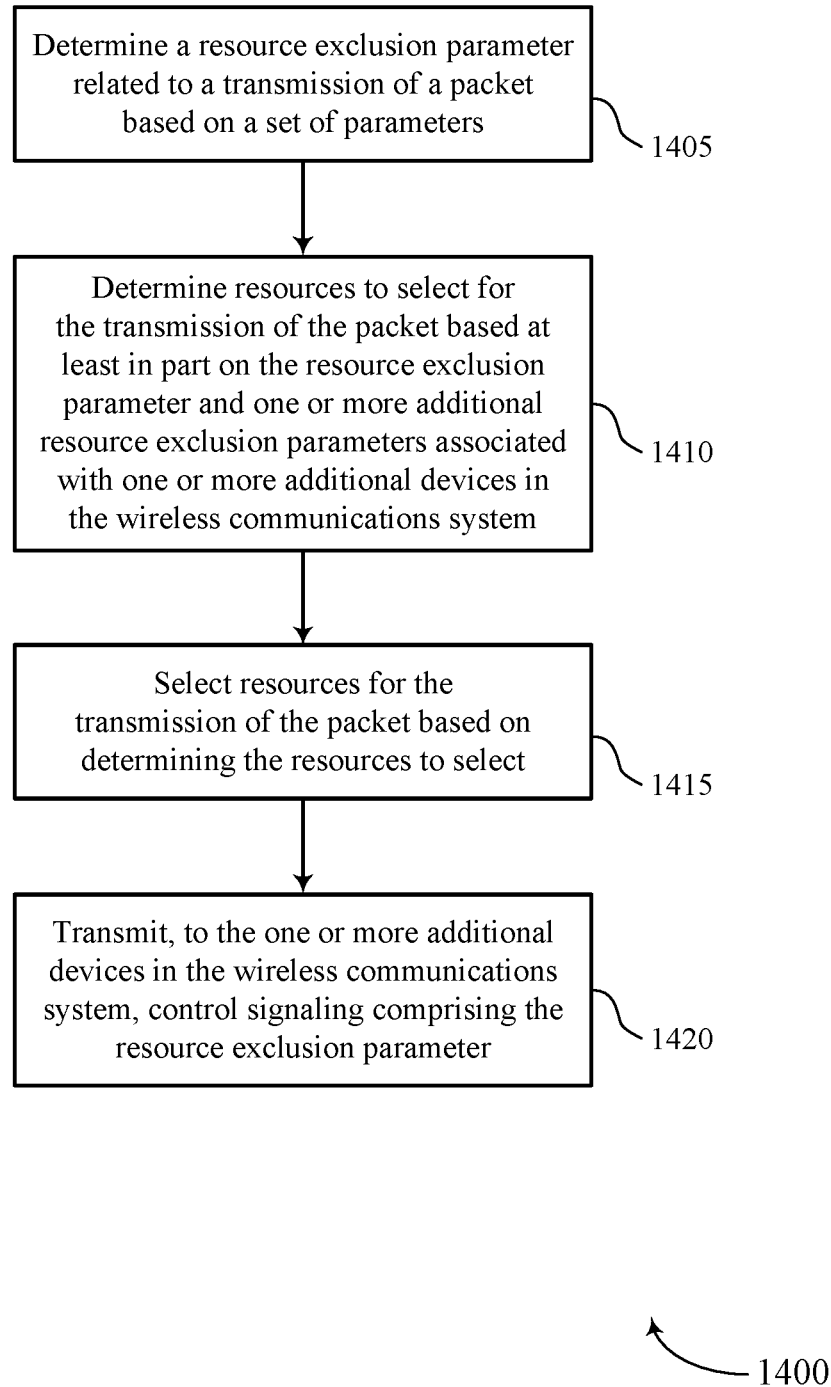

FIG. 14 shows a flowchart illustrating a method 1400 that supports distance based resource exclusion in accordance with one or more aspects of the present disclosure. The operations of method 1400 may be implemented by a device or its components as described herein. For example, the operations of method 1400 may be performed by a communications manager as described with reference to FIGS. 1 and 6 through 9. In some examples, a device may execute a set of instructions to control the functional elements of the device to perform the functions described below. Additionally or alternatively, a device may perform aspects of the functions described below using special-purpose hardware.

At 1405, the device may determine a resource exclusion parameter related to a transmission of a packet based on a set of parameters. The operations of 1405 may be performed according to the methods described herein. In some examples, aspects of the operations of 1405 may be performed by a distance component as described with reference to FIGS. 1 and 6 through 9.

At 1410, the device may determine resources to select for the transmission of the packet based on the resource exclusion parameter and one or more resource exclusion parameters associated with one or more other devices in the wireless communications system. The operations of 1410 may be performed according to the methods described herein. In some examples, aspects of the operations of 1410 may be performed by a resources component as described with reference to FIGS. 1 and 6 through 9.

At 1415, the device may select resources for the transmission of the packet based on the determination. The operations of 1415 may be performed according to the methods described herein. In some examples, aspects of the operations of 1415 may be performed by a resources component as described with reference to FIGS. 1 and 6 through 9.

At 1420, the device may transmit, to the one or more other devices in the wireless communications system, control signaling including the resource exclusion parameter. The operations of 1420 may be performed according to the methods described herein. In some examples, aspects of the operations of 1420 may be performed by a signaling component as described with reference to FIGS. 1 and 6 through 9.

It should be noted that the methods described herein describe possible implementations, and that the operations may be rearranged or otherwise modified and that other implementations are possible. Further, aspects from two or more of the methods may be combined.

Example 1

A method for wireless communications at a device in a wireless communications system, comprising: determining a set of parameters related to a transmission of a packet; determining a resource exclusion parameter related to the transmission of the packet based at least in part on the set of parameters; and transmitting, to one or more other devices in the wireless communications system, control signaling comprising the resource exclusion parameter.

Example 2

The method of example 1, wherein determining the set of parameters comprises: determining a transmission range indication for the packet or a QoS of the packet, or a combination thereof; and determining the resource exclusion parameter further based at least in part on the transmission range indication for the packet or the QoS of the packet, or a combination thereof.

Example 3

The method of example 2, further comprising: mapping the transmission range indication for the packet or the QoS of the packet, or a combination thereof, to the resource exclusion parameter in a candidate set of resource exclusion parameters, wherein determining the resource exclusion parameter related to the transmission of the packet is based at least in part on the mapping.

Example 4

The method of any of examples 1 to 2, further comprising: determining the resource exclusion parameter based at least in part on a mapping of one or more resource exclusion parameters of one or more transmissions associated with the one or more other devices in the wireless communications system.

Example 5

The method of any of examples 1 to 4, further comprising: determining a congestion level related to traffic load in the wireless communications system based at least in part on a resource unavailability, a packet size, or a packet priority, the QoS of the packet, or a mapping of one or more resource reservations of one or more transmissions associated with the one or more other devices in the wireless communications system, or a combination thereof, the one or more resource reservations comprising one or more transmission time intervals; and mapping the congestion level to a congestion index value, wherein determining the resource exclusion parameter is further based at least in part on the congestion index value.

Example 6

The method of any of examples 1 to 5, wherein transmitting the control signaling comprises: including, in the control signaling, information comprising a position of the device within the wireless communications system.

Example 7

The method of any of examples 1 to 6, wherein the set of parameters comprises a transmission range indication for the packet, a QOS of the packet, a priority of the packet, or a combination thereof.

Example 8

The method of any of examples 1 to 7, wherein the resource exclusion parameter is a resource avoidance mechanism to the one or more other devices in the wireless communications system.

Example 9

An apparatus for wireless communications comprising a processor; memory in electronic communication with the processor; the processor and memory configured to perform a method of any of examples 1 to 8.

Example 10

A non-transitory computer-readable medium storing code for wireless communications, the code comprising instructions executable by a processor to perform a method of any of examples 1 to 8.

Example 11

An apparatus, comprising means for performing the method of any of examples 1 to 8.

Example 12

A method for wireless communications at a device in a wireless communications system, comprising: determining a resource exclusion parameter related to a transmission of a packet based at least in part on a set of parameters; determining resources to select for the transmission of the packet based at least in part on the resource exclusion parameter and one or more additional resource exclusion parameters associated with one or more other devices in the wireless communications system; and selecting resources for the transmission of the packet based at least in part on determining the resources to select.

Example 13

The method of example 12, further comprising: determining a distance between the device and the one or more other devices in the wireless communications system, wherein determining the resources to select for the transmission of the packet is based at least in part on the distance between the device and the one or more other devices in the wireless communications system.

Example 14

The method of example 13, further comprising: determining that the distance is less than or equal, or greater than or equal, to the resource exclusion parameter associated with the device or to the one or more additional resource exclusion parameters associated with the one or more other devices in the wireless communications system, or a combination thereof, wherein determining the resources to select for the transmission of the packet is further based at least in part on the distance being less than or equal to the resource exclusion parameter associated with the device or the one or more additional resource exclusion parameters associated with one or more other devices in the wireless communications system, or a combination thereof.

Example 15

The method of example 14, further comprising: determining reserved resources of transmissions associated with the one or more other devices in the wireless communications system based at least in part on an indication, the reserved resources comprising at least one of a transmission time interval, wherein selecting the resources for the transmission of the packet further comprises selecting the set of candidate resources for transmissions that are non-overlapping with the reserved resources of transmissions associated with the one or more other devices in the wireless communications system based at least in part on the distance being less than or equal to the resource exclusion parameter associated with the device or the one or more additional resource exclusion parameters associated with one or more other devices in the wireless communications system, or a combination thereof.

Example 16

The method of example 14, further comprising: selecting reserved resources of transmissions associated with the one or more other devices in the wireless communications system based at least in part on an indication, wherein selecting the resources for the transmission of the packet further comprise selecting the set of candidate resources for transmissions that are overlapping or non-overlapping with the reserved resources of transmissions associated with the one or more other devices in the wireless communications system based at least in part on the packet having a higher relative priority compared to packets associated with the one or more other devices in the wireless communications system.

Example 17

The method of any of examples 12 to 16, wherein the reserved resources for the transmission of the packet are during a present transmission time interval or a subsequent transmission time interval.

Example 18

The method of any of examples 12 to 17, further comprising: transmitting, to the one or more other devices in the wireless communications system, control signaling comprising the resource exclusion parameter.

Example 19

The method of any of examples 12 to 18, wherein the set of parameters comprises a transmission range indication for the packet, a QOS of the packet, or a combination thereof.

Example 20

The method of any of examples 12 to 19, wherein determining the resource exclusion parameter further comprises: determining the resource exclusion parameter based at least in part on the transmission range indication for the packet, the QoS of the packet, or a combination thereof.

Example 21

The method of any of examples 12 to 20, further comprising: mapping the transmission range indication for the packet, the QoS of the packet, or a combination thereof to the resource exclusion parameter in a candidate set of resource exclusion parameters, wherein determining the resource exclusion parameter related to the transmission of the packet is further based at least in part on the mapping.

Example 22

The method of any of examples 12 to 21, further comprising: determining the resource exclusion parameter based at least in part on a mapping of additional resource exclusion parameters of transmissions associated with the one or more other devices in the wireless communications system.

Example 23

The method of any of examples 12 to 22, further comprising: determining a congestion level related to traffic load in the wireless communications system based at least in part on a mapping of additional resource reservations of transmissions associated with the one or more other devices in the wireless communications system, the resources to reserve comprising at least one of a transmission time interval, wherein determining the resource exclusion parameter is based at least in part on the congestion level.

Example 24

The method of any of examples 12 to 23, wherein the resource exclusion parameter is a resource avoidance mechanism to the one or more other devices in the wireless communications system.

Example 25

An apparatus for wireless communications comprising a processor; memory in electronic communication with the processor; the processor and memory configured to perform a method of any of examples 12 to 24.

Example 26

A non-transitory computer-readable medium storing code for wireless communications, the code comprising instructions executable by a processor to perform a method of any of examples 12 to 24.

Example 27

An apparatus, comprising means for performing the method of any of examples 12 to 24.

Techniques described herein may be used for various wireless communications systems such as CDMA, TDMA, FDMA, OFDMA, single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell may cover a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers. A gNB for a macro cell may be referred to as a macro gNB. A gNB for a small cell may be referred to as a small cell gNB, a pico gNB, a femto gNB, or a home gNB. A gNB may support one or multiple (e.g., two, three, four, and the like) cells (e.g., component carriers).

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an operation that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a device in a wireless communications system, comprising:
   determining a set of parameters related to a transmission of a packet;
   determining a transmission range indication for the packet or a Quality-of-Service (QoS) of the packet, or a combination thereof;
   mapping the transmission range indication for the packet or the QoS of the packet, or a combination thereof, to a range of resource exclusion parameters in a candidate set of resource exclusion parameters;
   determining a resource exclusion parameter related to the transmission of the packet from the candidate set of resource exclusion parameters based at least in part on the set of parameters and the mapping; and
   communicating with one or more other devices in the wireless communications system.

2. The method of claim 1, wherein determining the resource exclusion parameter further comprises:
   determining the resource exclusion parameter based at least in part on a mapping of one or more resource exclusion parameters of one or more transmissions associated with the one or more other devices in the wireless communications system.

3. The method of claim 1, further comprising:
   determining a congestion level related to traffic load in the wireless communications system based at least in part on a resource unavailability, a packet size, or a packet priority, the QoS of the packet, or a mapping of one or more resource reservations of one or more transmissions associated with the one or more other devices in the wireless communications system, or a combination thereof, the one or more resource reservations comprising one or more transmission time intervals; and
   mapping the congestion level to a congestion index value, wherein determining the resource exclusion parameter is further based at least in part on the congestion index value.

4. The method of claim 1, further comprising:
   transmitting control signaling including information comprising a position of the device within the wireless communications system.

5. The method of claim 1, wherein the set of parameters comprises the transmission range indication for the packet, a QoS of the packet, a priority of the packet, or a combination thereof.

6. The method of claim 1, wherein the resource exclusion parameter is a resource avoidance mechanism to the one or more other devices in the wireless communications system.

7. A method for wireless communications at a device in a wireless communications system, comprising:
   determining a set of parameters related to a transmission of a packet comprising a transmission range indication for the packet, a Quality-of-Service (QoS) of the packet, or a combination thereof;
   mapping the transmission range indication for the packet or the QoS of the packet, or a combination thereof, to a range of resource exclusion parameters in a candidate set of resource exclusion parameters;
   determining a resource exclusion parameter related to the transmission of the packet based at least in part on the set of parameters and the mapping;
   determining resources to select for the transmission of the packet based at least in part on the resource exclusion parameter and one or more additional resource exclusion parameters associated with one or more other devices in the wireless communications system; and
   selecting resources for the transmission of the packet based at least in part on determining the resources to select.

8. The method of claim 7, further comprising:
   determining a distance between the device and the one or more other devices in the wireless communications system,
   wherein determining the resources to select for the transmission of the packet is based at least in part on the distance between the device and the one or more other devices in the wireless communications system.

9. The method of claim 8, further comprising:
   determining that the distance is less than or equal, or greater than or equal, to the resource exclusion parameter associated with the device or to the one or more additional resource exclusion parameters associated with the one or more other devices in the wireless communications system, or a combination thereof,
   wherein determining the resources to select for the transmission of the packet is further based at least in part on the distance being less than or equal to the resource exclusion parameter associated with the device or the one or more additional resource exclusion parameters associated with one or more other devices in the wireless communications system, or a combination thereof.

10. The method of claim 9, further comprising:
    determining reserved resources of transmissions associated with the one or more other devices in the wireless communications system based at least in part on an indication, the reserved resources comprising at least one of a transmission time interval,
    wherein determining the resources to select for the transmission of the packet further comprises selecting a set of candidate resources for transmissions that are non-overlapping with the reserved resources of transmissions associated with the one or more other devices in the wireless communications system based at least in part on the distance being less than or equal to the resource exclusion parameter associated with the device or the one or more additional resource exclusion parameters associated with one or more other devices in the wireless communications system, or a combination thereof.

11. The method of claim 9, further comprising:
determining reserved resources of transmissions associated with the one or more other devices in the wireless communications system based at least in part on an indication,
wherein determining the resources to select for the transmission of the packet further comprise selecting a set of candidate resources for transmissions that are overlapping or non-overlapping with the reserved resources of transmissions associated with the one or more other devices in the wireless communications system based at least in part on the packet having a higher relative priority compared to packets associated with the one or more other devices in the wireless communications system.

12. The method of claim 11, wherein the reserved resources for the transmission of the packet are during a present transmission time interval or a subsequent transmission time interval.

13. The method of claim 7, further comprising:
transmitting, to the one or more other devices in the wireless communications system, control signaling comprising the resource exclusion parameter.

14. The method of claim 7, wherein determining the resource exclusion parameter is further based at least in part on a mapping of additional resource exclusion parameters of transmissions associated with the one or more other devices in the wireless communications system.

15. The method of claim 7, further comprising:
determining a congestion level related to traffic load in the wireless communications system based at least in part on a mapping of additional resource reservations of transmissions associated with the one or more other devices in the wireless communications system, the resources to reserve comprising at least one of a transmission time interval,
wherein determining the resource exclusion parameter is further based at least in part on the congestion level.

16. The method of claim 7, wherein the resource exclusion parameter is a resource avoidance mechanism to the one or more other devices in the wireless communications system.

17. An apparatus for wireless communications at a device in a wireless communications system, comprising:
a processor, memory coupled with the processor, the processor configures the apparatus to:
determine a set of parameters related to a transmission of a packet;
determine a transmission range indication for the packet or a Quality-of-Service (QoS) of the packet, or a combination thereof;
map the transmission range indication for the packet or the QoS of the packet, or a combination thereof, to a range of resource exclusion parameters in a candidate set of resource exclusion parameters;
determine a resource exclusion parameter related to the transmission of the packet from the candidate set of resource exclusion parameters based at least in part on the set of parameters and based at least in part on the mapping; and
communicate with one or more other devices in the wireless communications system.

18. The apparatus of claim 17, wherein the processor further configures the apparatus to:
determine a congestion level related to traffic load in the wireless communications system based at least in part on a resource unavailability, a packet size, or a packet priority, the QoS of the packet, or a mapping of one or more resource reservations of one or more transmissions associated with the one or more other devices in the wireless communications system, or a combination thereof, the one or more resource reservations comprising one or more transmission time intervals; and
map the congestion level to a congestion index value, wherein the determination of the resource exclusion parameter is further based at least in part on the congestion index value.

19. An apparatus for wireless communications at a device in a wireless communications system, comprising:
a processor, memory coupled with the processor, the processor configured to:
determine a set of parameters related to a transmission of a packet comprising a transmission range indication for the packet, a Quality-of-Service (QoS) of the packet, or a combination thereof;
map the transmission range indication for the packet or the QoS of the packet, or a combination thereof, to a range of resource exclusion parameters in a candidate set of resource exclusion parameters;
determine a resource exclusion parameter related to the transmission of the packet based at least in part on the set of parameters and the mapping;
determine resources to select for the transmission of the packet based at least in part on the resource exclusion parameter and one or more additional resource exclusion parameters associated with one or more other devices in the wireless communications system; and
select resources for the transmission of the packet based at least in part on determining the resources to select.

20. The apparatus of claim 19, wherein the processor is further configured to:
determine a distance between the device and the one or more other devices in the wireless communications system,
wherein the determination of the resources to select for the transmission of the packet is based at least in part on the distance between the device and the one or more other devices in the wireless communications system.

21. The apparatus of claim 20, wherein the processor is further configured to:
determine that the distance is less than or equal, or greater than or equal, to the resource exclusion parameter associated with the device or to the one or more additional resource exclusion parameters associated with the one or more other devices in the wireless communications system, or a combination thereof,
wherein the determination of the resources to select for the transmission of the packet is further based at least in part on the distance being less than or equal to the resource exclusion parameter associated with the device or the one or more additional resource exclusion parameters associated with one or more other devices in the wireless communications system, or a combination thereof.

22. The apparatus of claim 21, wherein the processor is further configured to:
determine reserved resources of transmissions associated with the one or more other devices in the wireless communications system based at least in part on an indication, the reserved resources comprising at least one of a transmission time interval, wherein the determination of the resources to select for the transmission of the packet further comprises selecting a set of candidate resources for transmissions that are non-overlapping with the reserved resources of transmissions associated with the one or more other devices in the wireless communications system based at least in part on the distance being less than or equal to the resource exclusion parameter associated with the device or the one or more additional resource exclusion parameters associated with one or more other devices in the wireless communications system, or a combination thereof.

23. The apparatus of claim 21, wherein the processor is further configured to:
determine reserved resources of transmissions associated with the one or more other devices in the wireless communications system based at least in part on an indication,
wherein the determination of the resources to select for the transmission of the packet further comprises the processor configured to select a set of candidate resources for transmissions that are overlapping or non-overlapping with the reserved resources of transmissions associated with the one or more other devices in the wireless communications system based at least in part on the packet having a higher relative priority compared to packets associated with the one or more other devices in the wireless communications system.

24. A non-transitory computer-readable medium storing code for wireless communication at a device in a wireless communications system, the code comprising instructions executable by a processor to:
determine a set of parameters related to a transmission of a packet;
determine a transmission range indication for the packet or a Quality-of-Service (QoS) of the packet, or a combination thereof;
map the transmission range indication for the packet or the QoS of the packet, or a combination thereof, to a range of resource exclusion parameters in a candidate set of resource exclusion parameters;
determine a resource exclusion parameter related to the transmission of the packet from the candidate set of resource exclusion parameters based at least in part on the set of parameters and based at least in part on the mapping; and
communicate with one or more other devices in the wireless communications system.

25. A non-transitory computer-readable medium storing code for wireless communication at a device in a wireless communications system, the code comprising instructions executable by a processor to:
determine a set of parameters related to a transmission of a packet comprising a transmission range indication for the packet, a Quality-of-Service (QoS) of the packet, or a combination thereof;
map the transmission range indication for a packet or the QoS of the packet, or a combination thereof, to a range of resource exclusion parameters in a candidate set of resource exclusion parameters;
determine a resource exclusion parameter related to the transmission of the packet based at least in part on the set of parameters and the mapping;
determine resources to select for the transmission of the packet based at least in part on the resource exclusion parameter and one or more additional resource exclusion parameters associated with one or more other devices in the wireless communications system; and
select resources for the transmission of the packet based at least in part on determining the resources to select.

26. The apparatus of claim 17, wherein the processor is further configured to:
determine a congestion level related to traffic load in the wireless communications system based at least in part on a resource unavailability, a packet size, or a packet priority, the QoS of the packet, or a mapping of one or more resource reservations of one or more transmissions associated with the one or more other devices in the wireless communications system, or a combination thereof, the one or more resource reservations comprising one or more transmission time intervals; and
map the congestion level to a congestion index value, wherein the determination of the resource exclusion parameter is further based at least in part on the congestion index value.

27. The apparatus of claim 17, wherein the processor is further configured to:
transmit control signaling including information comprising a position of the device within the wireless communications system.

28. The apparatus of claim 17, wherein the set of parameters comprises the transmission range indication for the packet, a QoS of the packet, a priority of the packet, or a combination thereof.

* * * * *